US010259714B2

(12) United States Patent
Zhu et al.

(10) Patent No.: US 10,259,714 B2
(45) Date of Patent: Apr. 16, 2019

(54) METHOD OF MAKING MESOPOROUS CARBON FROM NATURAL WOOD AND MESOPOROUS CARBON HOLLOW TUBES MADE THEREBY

(71) Applicants: Jiahua Zhu, Cuyahoga Falls, OH (US); Long Chen, Cuyahoga Falls, OH (US); Tuo Ji, Akron, OH (US)

(72) Inventors: Jiahua Zhu, Cuyahoga Falls, OH (US); Long Chen, Cuyahoga Falls, OH (US); Tuo Ji, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 255 days.

(21) Appl. No.: 15/073,969

(22) Filed: Mar. 18, 2016

(65) Prior Publication Data

US 2016/0272502 A1    Sep. 22, 2016

Related U.S. Application Data

(60) Provisional application No. 62/135,393, filed on Mar. 19, 2015.

(51) Int. Cl.
*C01B 32/318* (2017.01)
*C01B 32/30* (2017.01)
*C01B 32/05* (2017.01)

(52) U.S. Cl.
CPC .............. *C01B 32/30* (2017.08); *C01B 32/05* (2017.08); *C01P 2004/13* (2013.01); *C01P 2006/12* (2013.01); *C01P 2006/17* (2013.01)

(58) Field of Classification Search
CPC ....... C01B 31/086; C01B 32/05; C01B 32/30; C01P 2004/13; C01P 2006/12; C01P 2006/17
See application file for complete search history.

(56) References Cited

U.S. PATENT DOCUMENTS 6,228,803 B1    5/2001    Gadkaree et al.
7,029,273 B2    4/2006    Fung et al.

FOREIGN PATENT DOCUMENTS

CN    1245776    3/2000
CN    102247806    10/2013
WO    2011161314    12/2011

OTHER PUBLICATIONS

Suhas, et al., Lignin—from natural adsorbent to activated carbon: A review, Bioresource Technology 2007; 98: 2301-2312 (Year: 2007).*

(Continued)

*Primary Examiner* — Daniel McCracken
(74) *Attorney, Agent, or Firm* — Renner Kenner Greive Bobak Taylor & Weber

(57) ABSTRACT

In various embodiments, the present invention provides a relatively low cost and substantially chemical free method of making high surface area mesoporous carbon (as well as novel mesoporous carbon hollow tube (MCHT) structures made thereby) utilizing the cellulose framework found in natural wood and/or other plant fibers to make porous carbon structures. In some embodiments, the present invention will provide porous carbon structures having higher surface area than porous carbon structures made using prior art template methods, higher adsorption capacity than commercial activated carbon, and, in some embodiments, excellent electrochemical capacitance and storage capabilities. These new carbon materials may be adapted for a wide variety of uses including such things as removal of both inorganic and organic toxic pollutants from water, energy storage/conversion, supercapacitor electrodes for electrochemical energy storage, adsorption, and catalysis.

13 Claims, 13 Drawing Sheets

(56) References Cited

OTHER PUBLICATIONS

Del Bagno, et al., On-Site Production of Activated Carbon From Kraft Black Liquor, U.S. Environmental Protection Agency publication EPA-600/2-78-191, pp. 1-85 (Jul. 1978) (Year: 1978).*

* cited by examiner

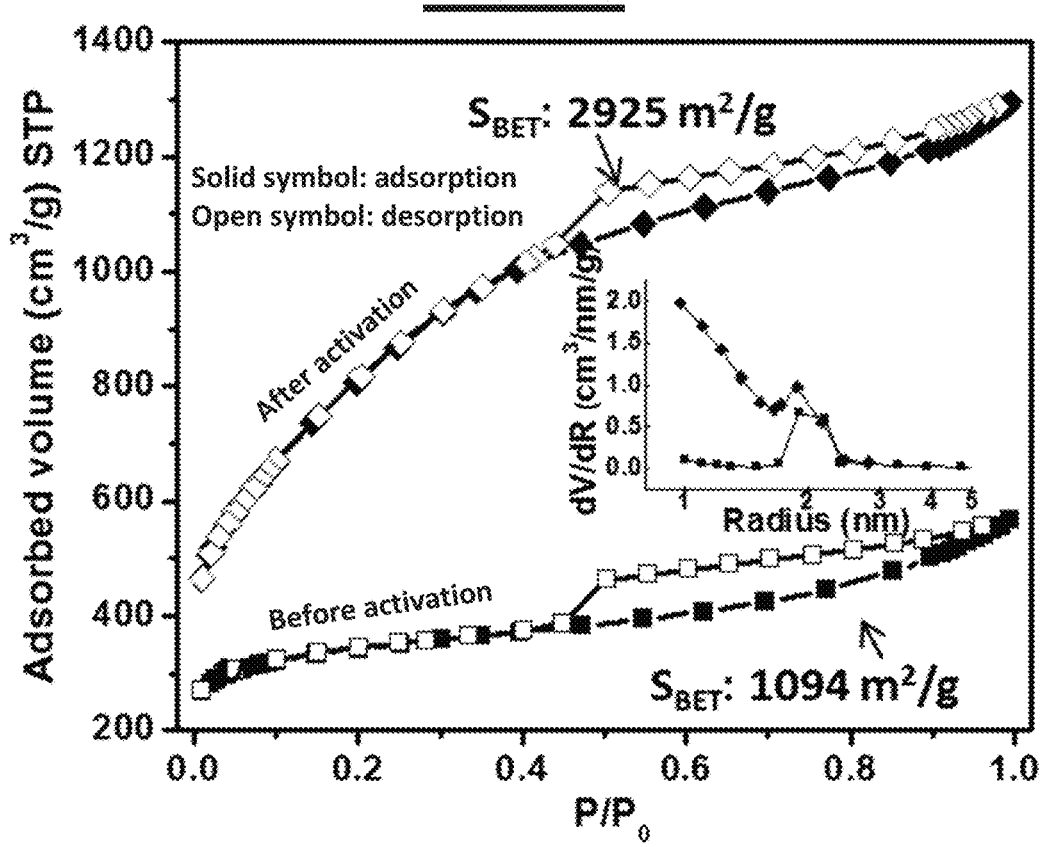

1- HPTC
2- HPTC(r)
3- a-HPTC
4- a-HPTC(r)

METHOD OF MAKING MESOPOROUS CARBON FROM NATURAL WOOD AND MESOPOROUS CARBON HOLLOW TUBES MADE THEREBY

CROSS-REFERENCE TO RELATED APPLICATIONS

The present invention claims priority to U.S. Provisional Patent Application No. 62/135,393, filed Mar. 19, 2015, and incorporated herein by reference.

FIELD OF THE INVENTION

The present invention generally relates to porous carbon, and, in particular embodiments to mesoporous carbon hollow tube (MCHT) structures. The invention also relates to methods of converting natural wood to mesoporous carbon, and, in particular embodiments, MCHT structures.

BACKGROUND OF THE INVENTION

The tunable pore structure in porous carbon materials makes them ideal candidates for a variety of applications, including, for example, adsorption and separation, catalysis, energy storage/conversion, and electrochemical sensors. In applications where it is desirable to have a rapid diffusion of molecules into a porous carbon internal surface—for example, in adsorption and catalytic reactions—it is desirable to employ materials containing mesopores, i.e., materials containing pores with diameters between 2 and 50 nm.

Conventionally, mesoporous carbon (MC) is synthesized by a nanocasting method, often called a hard-template method, where a carbon precursor is introduced into the pores of an ordered mesoporous silica by impregnation, followed by in-situ carbonization and removal of the silica template. This hard-templating method is time-consuming, costly, and unsuitable for scale-up production. In particular, the necessity to remove the inorganic template by employing hazardous chemicals such as HF and NaOH is an unavoidable drawback. Alternatively, direct soft-templating of the carbon material has been developed to prepare MC, which avoids the use of hazardous chemicals employed for the template removal. The soft-template method involves the cooperative assembly of structure-directing agents that are able to form lyotropic phases with suitable organic carbon precursors. Since the first successful synthesis of ordered MC by soft-templating with amphiphilic block-copolymers in 2004, extensive research has been conducted to fabricate different pore structures including but not limited to p6mm, Im3m, Ia3d, Fm3m, and Fd3m. However, the major concern in employing soft-templating methods comes from the utilization and/or release of hazardous reactants such as formaldehyde and phenol during MC preparation. In fact, formaldehyde is often used as a cross-linking agent in MC synthesis, which is known to be carcinogenic and should be removed from industrial processes. Moreover, phenol is also carcinogenic and its derivatives are mostly toxic. Thus, it remains a great challenge so far to prepare MC materials by using "friendly" reagents or from a completely green process.

Utilizing biomass (raw resources such as wood, cotton or treated resources including cellulose, lignin, tannin and starch) as the carbon precursor to synthesize MC seems a promising approach. For example, tannin has been utilized as a precursor to synthesize ordered mesoporous carbon through a soft-template method. Nanocrystalline cellulose has been used as precursor to fabricate mesoporous carbon as well.

Even though both tannin and cellulose are widely accessible, it is not necessarily a green process to produce them. For example, NaOH (corrosive alkali) treatment is often used to extract the cellulose by removing lignin and hemicellulose from raw materials. Currently, it is the understanding of the current inventors of the present invention that all current methods rely on the use of certain chemicals to synthesize MC. From the current state of the art it appears it would be unrealistic to synthesize MC from a bottom-up approach without using chemicals.

FIG. 1 provides a general schematic of the basic structure of natural wood 10. The basic skeletal structure of natural wood 10 consists of arrays of tubular columns known as tracheid 12, which are formed primarily from the cell walls 13 of the arrayed plant cells. As can be seen in FIG. 1, these tracheids 12 have a central opening referred to as a lumen 14 and are held together by a lignin lamella 16. In the mature cell, the cell walls 13 are aggregated into strand-like units of structure called cellulose aggregates or microfibrils 18, formed primarily of a cellulose framework and hemicellulose matrix and having an average diameter of about 16 nm. The areas between these cellulose aggregates 18 define elliptical spaces 20 that have a length/width ratio of ~2 and a minor diameter across the ellipse of 5-10 nm. Once these elliptical spaces 20 in the cellulose/hemicellulose frame 22 are formed, they are then filled by lignin molecules 24 to form the final structure.

It is technically difficult to remove lignin without damaging cellulose framework from conventional chemical dissolution method. The currently practiced acid or alkali hydrolysis decreases the molecular weight and crystallinity of cellulose and hemicellulose and thus leads to cellulose structure breakdown. But, even if the cellulose porous framework remains after chemical treatment, the framework robustness is an issue during carbonization at elevated temperature.

What is needed in the art is a method to selectively remove the lignin and leave the cellulose/hemicellulose framework behind, thus providing a MC structure constructed by carbonized cellulose framework without the drawbacks of current methods.

SUMMARY OF THE INVENTION

In various embodiments, the present invention provides a relatively low cost and substantially chemical free method of making high surface area porous carbon (as well as novel mesoporous carbon hollow tube (MCHT) structures made thereby) utilizing the cellulose framework found in natural wood and/or other plant fibers to make porous carbon structures. In some embodiments, the present invention will provide porous carbon structures having higher surface area than porous carbon structures made using prior art template methods, higher adsorption capacity than commercial activated carbon, and, in some embodiments, excellent electrochemical capacitance and storage capabilities (>200 F/g with >90% retention after 5,000 charge-discharge cycling test). These new carbon materials may be adapted for a wide variety of uses including such things as removal of both inorganic and organic toxic pollutants from water, energy storage/conversion, supercapacitor electrodes for electrochemical energy storage, adsorption, and catalysis.

In a first aspect, various embodiments of the present invention are directed to a method for making a porous carbon material comprising the steps of: carbonizing a naturally occurring cellulose framework containing lignin to form a carbonized structure containing carbonized cellulose and carbonized lignin, the step of carbonizing including heating the cellulose framework and lignin in an inert atmosphere at a temperature and for a time sufficient to convert the cellulose and at least a portion of the lignin to carbon; cooling the carbonized structure, and, after the step of cooling; and oxidizing the carbonized lignin by heating the carbonized structure in the presence of oxygen to a temperature and for a time sufficient to volatilize, and thus remove, at least a portion of the carbonized lignin to provide a porous carbon structure. In some embodiments of this aspect of the present invention, the naturally occurring cellulose framework containing lignin comprises a plant material selected from the group consisting of soft woods, hard woods, switchgrass, cotton, bamboo, walnut shell, peanut shell, rattan, luffa, sugar cane, and combinations thereof.

In one or more embodiments, the method for making a porous carbon material of the present invention includes any one or more of the above referenced embodiments of the first aspect of the present invention wherein the step of carbonizing comprises heating the cellulose framework to a temperature of from about 500° C. to about 1,500° C. In one or more embodiments, the method for making a porous carbon material of the present invention includes any one or more of the above referenced embodiments of the first aspect of the present invention wherein the step of carbonizing comprises heating the cellulose framework to a temperature of from about 750° C. to about 850° C. In one or more embodiments, the method for making a porous carbon material of the present invention includes any one or more of the above referenced embodiments of the first aspect of the present invention wherein the step of heating the carbonized structure comprises heating the cellulose framework to a temperature of from about 600° C. to about 1500° C. for a period of from about 1 hour to about 6 hours.

In one or more embodiments, the method for making a porous carbon material of the present invention includes any one or more of the above referenced embodiments of the first aspect of the present invention wherein the step of oxidizing includes heating the carbonized structure to an initial temperature of from about 25° C. to about 50° C. and then gradually increasing the temperature to a second temperature from about 200° C. to about 500° C. at a rate of from about 1° C./min to about 20° C./min. In one or more embodiments, the method for making a porous carbon material of the present invention includes any one or more of the above referenced embodiments of the first aspect of the present invention wherein the step of oxidizing comprises increasing the surface area of the carbonized structure by continuing to heat the cellulose framework after substantially all of the carbonized lignin has been oxidized.

In one or more embodiments, the method for making a porous carbon material of the present invention includes any one or more of the above referenced embodiments of the first aspect of the present invention wherein the porous carbon structure comprises pores having a mean diameter of from 2 nm or more to 30 nm or less. In one or more embodiments, the method for making a porous carbon material of the present invention includes any one or more of the above referenced embodiments of the first aspect of the present invention wherein, after the step of oxidizing, the method further comprises the step of chemically etching the porous carbon structure thereby increasing its surface area.

In one or more embodiments, the method for making a porous carbon material of the present invention includes any one or more of the above referenced embodiments of the first aspect of the present invention wherein the step of etching comprises contacting the carbonized structure with an oxidizer selected from the group consisting of (1) a base, (2) an acid, and (3) an oxidizing gas such as steam. In one or more embodiments, the method for making a porous carbon material of the present invention includes any one or more of the above referenced embodiments of the first aspect of the present invention wherein the step of etching comprises contacting the carbonized structure with potassium hydroxide.

In one or more embodiments, the method for making a porous carbon material of the present invention includes any one or more of the above referenced embodiments of the first aspect of the present invention wherein, after the step of oxidizing, the method further comprises thermally annealing the carbonized structure. In one or more embodiments, the method for making a porous carbon material of the present invention includes any one or more of the above referenced embodiments of the first aspect of the present invention wherein the step of thermally annealing comprises heating the carbonized structure in an inert atmosphere devoid of oxygen to a temperature of between 600° C. or more and 1500° C. or less for a period of between 1 hours and 6 hours.

In a second aspect, various embodiments of the present invention are directed to a porous tubular carbon structure having mesoporous walls. In some embodiments of this aspect of the present invention, the carbon tube structure comprising carbonized cellulose. In one or more embodiments, the carbon tube structure of the present invention includes any one or more of the above referenced embodiments of the second aspect of the present invention wherein the mesoporous walls comprise a plurality of pores having a mean diameter of from 2 nm or more to 30 nm or less.

In one or more embodiments, the carbon tube structure of the present invention includes any one or more of the above referenced embodiments of the second aspect of the present invention having a surface area of from about 500 $m^2/g$ to about 3000 $m^2/g$. In one or more embodiments, the carbon tube structure of the present invention includes any one or more of the above referenced embodiments of the second aspect of the present invention having an isothermal adsorption capacity for methylene blue of from about 300 mg/g to about 850 mg/g. In one or more embodiments, the carbon tube structure of the present invention includes any one or more of the above referenced embodiments of the second aspect of the present invention having an electrochemical capacitance of from about 100 F/g to about 250 F/g.

BRIEF DESCRIPTION OF THE DRAWINGS

FIG. 3A is an SEM image showing a top-view of c-wood, FIG. 3B is an SEM image showing a side-view of c-wood, FIG. 3C is an SEM image showing an enlarged magnification of c-wood side view (FIG. 3B), FIG.

3D is an SEM image showing a side-view of MCHT, and FIG. 3E is an SEM image showing an enlarged magnification of FIG. 3D focusing on the surface. FIG. 3F is a TEM image of MCHT showing well distributed pores.

FIG. 10 is a graph showing nitrogen isotherms of (a) MCHT and (b) a-MCHT at ° 77 K. The inset figure shows the pore size distribution based on Barrett-Joyner-Halenda (BJH) desorption.

DETAILED DESCRIPTION OF ILLUSTRATIVE EMBODIMENTS

I. Overview

Figure 1:
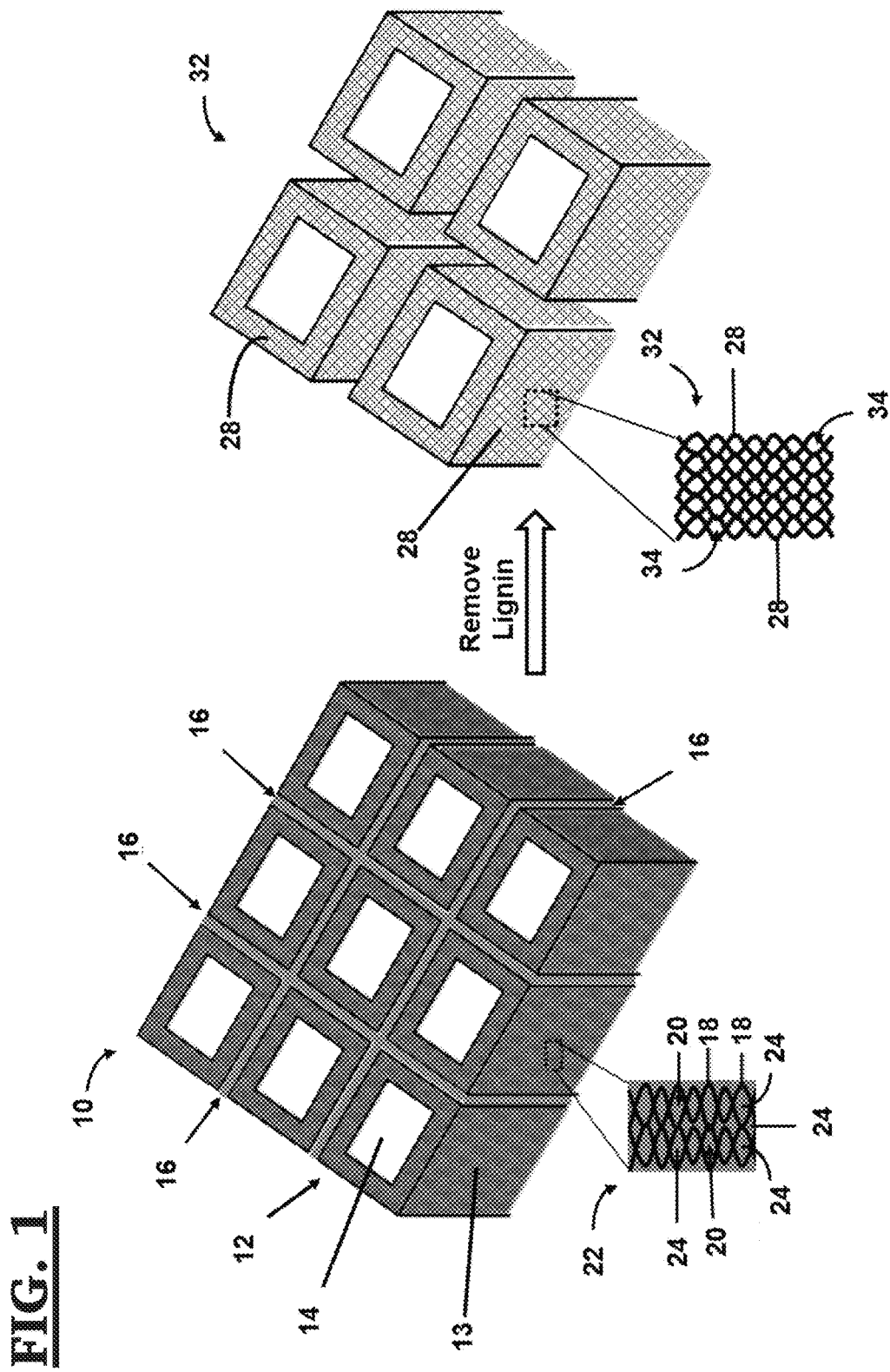
FIG. 1 provides a general schematic representation of the structure and chemical composition of natural wood (raw wood).

In various embodiments, the present invention provides a relatively low cost and substantially chemical free method of making high surface area porous carbon (as well as novel mesoporous carbon hollow tube (MCHT) structures made thereby) utilizing the cellulose framework found in natural wood and/or other plant fibers (herein "naturally occurring cellulose framework containing lignin" or "lignin-containing cellulose framework" for short) to make porous carbon structures. Many lignin-containing cellulose frameworks will generally follow the structure shown in FIG. 1 and discussed in the Background of the Invention, but others may differ, and this will be further addressed below. In some embodiments, the present invention will provide porous carbon structures having higher surface area than porous carbon structures made using prior art template methods, higher adsorption capacity than commercial activated carbon, and, in some embodiments, excellent electrochemical capacitance and storage capabilities (>200 F/g with >90% retention after 5,000 charge-discharge cycling test). These new carbon materials may be adapted for a wide variety of uses including such things as removal of both inorganic and organic toxic pollutants from water, energy storage/conversion, supercapacitor electrodes for electrochemical energy storage, adsorption, and catalysis.

In general outline, the method for making porous carbon material according to one or more embodiment of the present invention includes two steps. First, in a carbonization step, the lignin-containing cellulose framework is carbonized by heating it in an inert atmosphere (and in the absence of oxygen) at a temperature and for a time sufficient to convert both the cellulose/hemicellulose and at least a portion of the lignin to carbon. This first step forms a carbonized structure, which may be referred to herein as "carbonized wood" or "c-wood" and contains carbonized cellulose and carbonized lignin. The carbonized cellulose may be referred to herein interchangeably as "c-carbon" or "c-cellulose and the carbonized lignin may be interchangeably referred to herein as "l-carbon" or "c-lignin." After cooling, the carbonized structure is subjected to an oxidizing step, wherein the carbonized structure is heated in the presence of oxygen to a temperature and for a time sufficient to selectively oxidize and volatilize, and thus remove, at least a portion of the relatively volatile l-carbon, thereby providing a porous carbon structure. In some embodiments, these porous carbon structures may then be "activated" by further treating them with an etching agent to provide an activated carbonized structure having increased porosity, increased surface area, abundant surface functional groups, and superior adsorption properties. In some other embodiments, these porous carbon structures may be annealed in an inert atmosphere (and in the absence of oxygen) to produce a carbonized structure having excellent electrical properties.

In some embodiments, the porous carbon structures formed using the novel methods of the present invention retain the generally tubular structure of the wood or other natural material from which they are made and have a mesoporous wall structure. See FIG. 1. Porous carbon structures having this type of structure may be referred to herein interchangeably as mesoporous hollow carbon tubes (MCHT) or hierarchically porous tubular carbon (HPTC). As set forth above, these structures may be activated by treatment with an etching agent such as KOH to form the activated structures referred to herein interchangeably as "a-MCHT" or "a-HPTC." Similarly, MCHT/HPTC and/or a-MCHT/a-HPTC can be annealed in an inert atmosphere (and the absence of oxygen) as set forth herein to produce a corresponding carbonized structure having excellent electrical properties, referred to herein as interchangeably as "r-MCHT" or "r-HPTC."

II. Wood/Cellulose Source

The source of the lignin-containing cellulose framework used herein may be any natural wood or any other suitable plant material or fiber having lignin-containing cellulose framework with a mesoporous wall structure, as described herein. As used herein, the terms "natural wood" is to be broadly understood as being any wood that was produced naturally (i.e., grown on a tree or other plant). In one or more embodiments, the lignin-containing cellulose framework is sourced from a plant material selected from the group consisting of soft woods, hard woods, switchgrass, cotton, bamboo, walnut shell, peanut shell, rattan, luffa, sugar cane, or any combinations thereof. In some embodiments, the natural wood is selected from spruce, pine, fir, maple, and oak.

The shape and basic structure of the lignin-containing cellulose framework will, of course, depend upon the particular type of wood or other plant material used. In one or more embodiments, the lignin-containing cellulose framework may have the general structure shown in FIG. 1 (left), but the invention is not so limited. The lignin-containing cellulose framework 10 shown in FIG. 1 is typical of soft woods (i.e. gymnosperms) such as spruce, pine, or fir. In these materials, the basic skeletal substance of the wood are the cell walls, which in the mature cell, are aggregated into units of structure called cellulose aggregates or microfibrils 18, which are formed from cellulose and hemicellulose, with the surrounding spaces 20 filled with lignin molecules 24.

The size of the cellulose aggregates or microfibrils 18 will, of course, depend upon the type of wood or plant material chosen, but these cellulose aggregates 18 will typically have diameters of from about 10 nm to about 50 nm. In some embodiments, the cellulose aggregates 18 may have a diameter greater than 12, in other embodiments, greater than 15 nm, in other embodiments, greater than 18 nm, in other embodiments, greater than 20 nm, in other embodiments, greater than 22 nm, and in other embodiments, greater than 25 nm, in other embodiments, greater than 30 nm, in other embodiments, greater than 35 nm. In some embodiments, the cellulose aggregates 18 may have a diameter of less than 45 nm, in other embodiments, less than 40 nm, in other embodiments, less than 37 nm, in other embodiments, less than 33 nm, in other embodiments, less than 30 nm, in other embodiments, less than 28 nm, in other embodiments, less than 24 nm, in other embodiments, less than 20 nm. In some embodiments, the cellulose aggregates 18 may have an average diameter of 16 nm.

In these embodiments, elliptical spaces 20 are formed in-between the cellulose aggregates 18. See FIGS. 1-2. As set forth above, these elliptical spaces in the naturally occurring cellulose/hemicellulose frame are generally filled lignin molecules. Again, the size of these elliptical spaces 20 will depend upon the type of wood or plant material chosen, but these elliptical spaces 20 will typically have a length/width ratio of from about 1:1 to about 5:1 and a minor diameter across the ellipse of from about 5 nm to about 10 nm. In one or more embodiments, the elliptical spaces 20 will have a length/width ratio of from about 1:1 to about 4:1.

In one or more embodiments, the elliptical spaces 20 will have a length/width ratio of from about 1:1 to about 3:1. In one or more embodiments, the elliptical spaces 20 will have a length/width ratio of from about 2:1 to about 5:1. In one or more embodiments, the elliptical spaces 20 will have a length/width ratio of from about 3:1 to about 5:1. In one or more embodiments, the elliptical spaces 20 will have a length/width ratio of from about 2:1 to about 4:1. In one or more embodiments, the elliptical spaces 20 will have a length/width ratio of about 2

In one or more embodiments, the elliptical spaces 20 will have a minor diameter across the ellipse of from about 2 nm or more to about 12 nm or less. In some embodiments, the elliptical spaces 20 will have a minor diameter across the ellipse of 4 or greater, in other embodiments, 6 nm or greater, in other embodiments, 7 nm or greater, in other embodiments, 8 nm or greater, in other embodiments, 9 nm or greater, and in other embodiments, 10 nm or greater. In some embodiments, the elliptical spaces 20 will have a minor diameter across the ellipse of 11 or less, in other embodiments, 10 nm or less, in other embodiments, 9 nm or less, in other embodiments, 8 nm or less, in other embodiments, 7 nm or less, and in other embodiments, 6 nm or less. In one or more embodiments, the elliptical spaces 20 will have a minor diameter across the ellipse of from 5 nm to 10 nm.

In some other embodiments, hard wood has a more complex structure than softwoods. The dominant feature separating "hardwoods" from softwoods is the presence of pores, or vessels. The vessels may show considerable variation in size, shape of perforation plates (simple, scalariform, reticulate, foraminate), and structure of cell wall, such as spiral thickenings. Accordingly, while these types of wood may be used to form porous carbon structures according to one or more embodiment of the present invention using the novel methods disclosed herein, the resulting porous carbon structure will not have the tube-like structure shown in FIG. 1, but will instead form a bulk piece mesoporous carbon.

While the size and or shape of the natural wood or other suitable plant material used is not particularly limited, it should be appreciated that these characteristics may have an effect on the heating times and temperatures for the various heating steps described below, particularly the oxidation heating step. In some embodiments, the natural wood or other suitable plant material samples used may be, without limitation, spruce-pine-fir, maple, oak, bamboo, cotton, walnut shell, peanut shell, rattan, luffa, sugar cane and/or combinations thereof.

The size and shape of the wood or other plant material used in the various embodiments of the present invention is not particularly limited, provided that the natural shape and basic structure of the lignin-containing cellulose framework is preserved, or not completely destroyed. That being said, size and shape and moisture content of the wood or other plant material used in the various embodiments of the present invention may affect the heating times in the oxidation step as described below. In some embodiments, the wood or other plant material may be used whole. In some embodiments, the wood or other plant material may be shredded, crushed, or formed into pellets. In one or more embodiments, the wood or other plant material may cut or divided into pieces having a three dimensional volume of from about 10 $mm^3$ or greater to about 500 $mm^3$ or less. In some embodiments, the wood or other plant material may cut or divided into pieces having a three dimensional volume of about 20 $mm^3$ or greater, in some embodiments, 50 $mm^3$ or greater, in some embodiments, 100 $mm^3$ or greater, in some embodiments, 150 mm³ or greater, in some embodiments, 200 mm³ or greater, in some embodiments, 250 mm³ or greater, and in some embodiments, 300 mm³ or more. In some embodiments, the wood or other plant material may cut or divided into pieces having a three dimensional volume of about 450 mm³ or less, in some embodiments, 400 mm³ or less, in some embodiments, 350 mm³ or less, in some embodiments, 300 mm³ or less, in some embodiments, 250 mm³ or less, in some embodiments, 200 mm³ or less, and in some embodiments, 150 mm³ or less. In some embodiments, the wood or other plant material may cut or divided into pieces having a three dimensional volume of about 90 mm³. In one or more embodiments, spruce-pine-fir (SPF) wood cut into 3×3×10 mm pieces may be used to practice the method of the present invention.

III. Method of Treatment

A. General

As set forth above, the present invention provides methods for forming porous carbon structures, including MCHT, a-MCHT, and r-MCHT structures. The MCHT product is formed through a carbonization step followed by an oxidation step. (See FIG. 2). The a- and r-type MCHT structures are produced through particular steps carried out post-oxidation.

B. Carbonization

As set forth above, the lignin-containing cellulose framework is carbonized by exposing it to heat in an inert atmosphere, and in particular, in the absence of oxygen. This process produces carbonized wood (c-wood) 26 by converting the cellulose/hemicellulose framework and some or all of the lignin into carbonized cellulose (c-carbon) 28 and carbonized lignin (l-carbon) 30.

The carbonization occurs over time and bigger pieces of the natural wood/plant material will take longer to carbonize. Moisture content and the like can also affect the heating time and temperature. The carbonization process should be carried out until all of the cellulose and lignin is carbonized. But it is necessary to carbonize the entire lignin-containing cellulose to c-carbon and l-carbon before moving to the oxidation step described below.

In one or more embodiment, the wood or other plant material is placed in the furnace at or about ambient temperature. The temperature is then increased ("ramped up") to a desired carbonization temperature, generally between 500° C. and 1500° C., at a rate (referred to herein as the "carbonization ramp up rate") of from about 1° C./min or more to about 20° C./min. In one or more embodiment, the carbonization ramp up rate is about 2° C./min or greater. In some embodiments, the carbonization ramp up rate is about 3° C./min or greater, in some embodiments, about 5° C./min or greater, in some embodiments, about 8° C./min or greater, in some embodiments, about 10° C./min or greater, and in some embodiments, about 15° C./min or greater. In one or more embodiment, the carbonization ramp up rate is about 17° C./min or less. In some embodiments, the carbonization ramp up rate is about 15° C./min or less, in some embodiments, about 13° C./min or less, in some embodiments, about 11° C./min or less, in some embodiments, about 9° C./min or less, and in some embodiments, about 7° C./min or less.

As will be appreciated by those of skill in the art, the selected carbonization temperature may depend on the wood or other plant material being carbonized, but is not generally affected by the size of the sample. In one or more embodiments, the carbonization temperature is greater than 500° C. In other embodiments, the carbonization temperature is greater than 600° C., in other embodiments, greater than 650° C., in other embodiments, greater than 700° C., in other embodiments, greater than 750° C., and in other embodiments, greater than 775° C. In one or more embodiments, the carbonization temperature is less than 1,500° C. In other embodiments, the carbonization temperature is less than 1,400° C., in other embodiments, less than 1,300° C., in other embodiments, less than 1,200° C., in other embodiments, less than 1,000° C., and in other embodiments, less than 900° C. In some embodiments, the carbonization temperature is between 600 and 1,300° C., in other embodiments, between 700 and 1,200° C., in other embodiments, between 700 and 900° C., in other embodiments, between 750 and 850° C., in other embodiments, and, in other embodiments, between 775 and 825° C. In some embodiments, the carbonization temperature is maintained at about 800° C.

The sample is then kept at the desired carbonization temperature for a period of from about 1 hours to about 6 hours (referred to herein as the "carbonization time"), until substantially all of the cellulose and lignin in the sample have been carbonized. As set forth above, it should be appreciated that the carbonization time will depend upon the size (mass) of the sample, and its moisture content. During carbonization, liquid can be observed being released from the lignin-containing cellulose framework, and when the release of liquid stops, this evidences a near completion of the carbonization process.

In one or more embodiments, the carbonization time is 1 hours or longer. In one or more embodiments, the carbonization time is at least 1 hours, in some embodiments, at least 2 hours, in some embodiments, at least 3 hours, in some embodiments, at least 4 hours, and in some embodiments, at least 5 hours. In one or more embodiments, the carbonization time is not more than 8 hours, in some embodiments, not more than 7 hours, in some embodiments, not more than 6 hours, in some embodiments, not more than 5 hours, in some embodiments, not more than 4 hours, in some embodiments, not more than 3 hours. In some embodiments the carbonization time is 2 hours.

C. Oxidation

Figure 2:
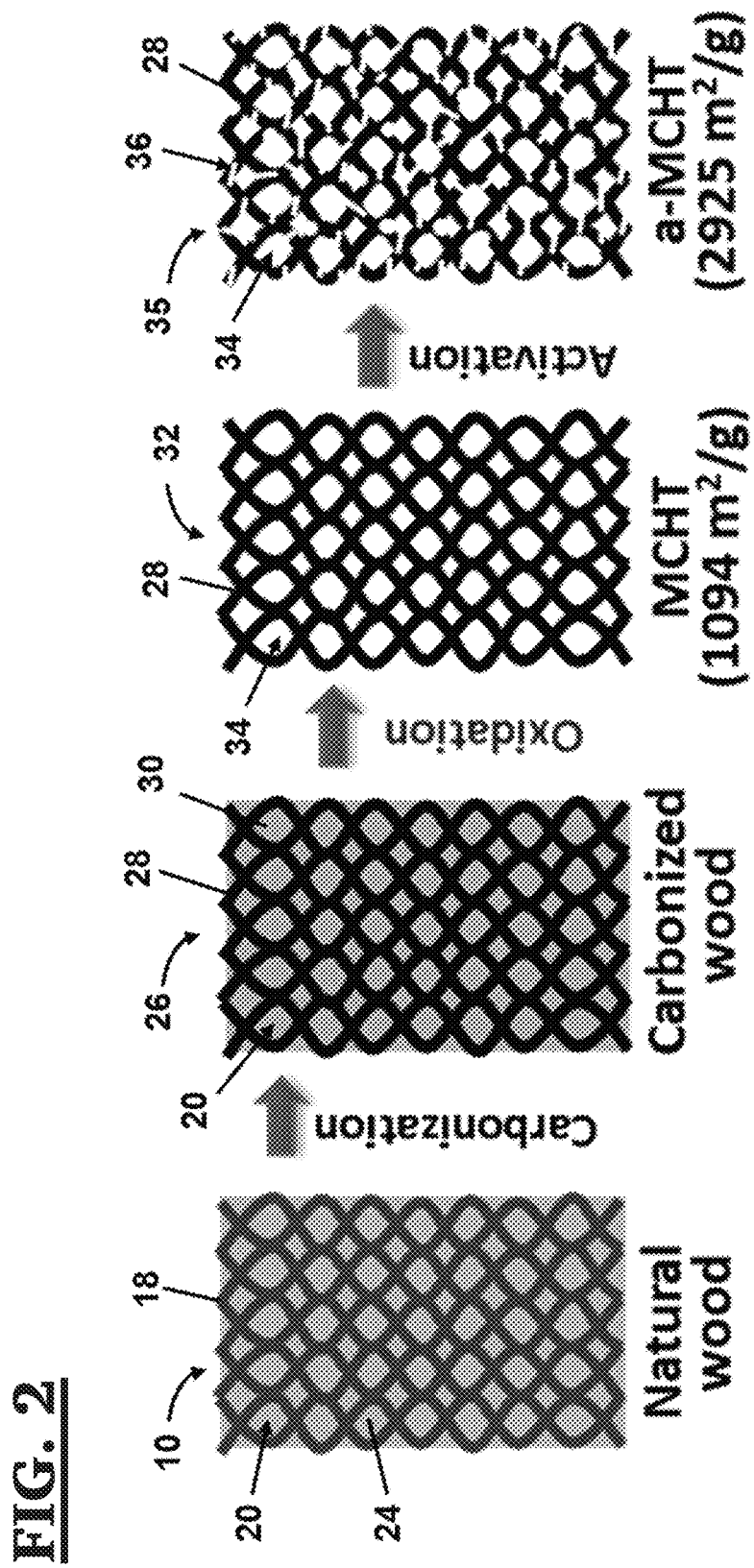
FIG. 2 is a general representation of process steps in accordance with this invention, employing the schematic of FIG. 1 and schematically showing the conversion of the natural wood to mesoporous carbon, more particularly a mesoporous carbon hollow tube structure.

After carbonization is complete, the c-wood 26 is first cooled to a temperature below the degradation temperature for l-carbon 30 and then subjected to an oxidation step in which it is heated in an atmosphere containing oxygen. The oxidation step serves to separate and then volatilize at least a portion of the l-carbon 30 to produce a (porous) carbon structure 32 having numerous pores, preferably mesopores, 34 throughout. See FIG. 1 (right); FIG. 2. In one or more embodiment, at least 20% of the l-carbon is volatilized and removed during the oxidation step. In some embodiments, at least 25% of the l-carbon is volatilized and removed, in some embodiments, at least 30%, in some embodiments, at least 40%, in some embodiments, at least 50%, in some embodiments, at least 60%, and in some embodiments, at least 70%. In one or more embodiments, substantially all of the l-carbon is volatilized and removed during the oxidation step. In one or more embodiment, not more than 99% of the l-carbon is volatilized and removed during the oxidation step. On some embodiments, not more than 95% of the l-carbon is volatilized and removed, in some embodiments, not more than 85%, in some embodiments, not more than 75%, in some embodiments, not more than 65%, in some embodiments, not more than 55%, and in some embodiments, not more than 45%.

In some embodiments, the temperature may be applied gradually, as described above with respect to the carbonization step, until a desired oxidation temperature is reached. As used herein, the term "oxidation temperature" refers to the temperature or temperature range at which the l-carbon oxidized. In these embodiments, the carbonized structure is heated to an initial temperature below the desired oxidation temperature, preferably between ambient temperature (about 20° C.) to about 50° C., and then the temperature is gradually increased ("ramped up") to a desired oxidation temperature of from about 200° C. to about 500° C. at a rate of from about 1° C./min to about 20° C./min (referred to herein as the "oxidation ramp up rate").

The oxidation temperature will be above the decomposition temperature of the l-carbon and may vary slightly with the molecular weight and composition of the lignin that was carbonized. In some embodiments, the oxidation temperature is greater than 270° C. In other embodiments, the oxidation temperature is greater than 280° C., in other embodiments, greater than 290° C., in other embodiments, greater than 300° C., in other embodiments, greater than 310° C., in other embodiments, greater than 320° C., in other embodiments, greater than 330° C., in other embodiments, greater than 340° C., in other embodiments, greater than 350° C., and in other embodiments, greater than 360° C. In some embodiments, the oxidation temperature is less than 370° C. In other embodiments, the oxidation temperature is less than 360° C., in other embodiments, less than 350° C., in other embodiments, less than 340° C., in other embodiments, less than 330° C., in other embodiments, less than 320° C., and in other embodiments, less than 310° C. In some embodiments, the temperature of the oxidation step is maintained between 280 and 370° C. In some embodiments, the temperature of the oxidation step is maintained between 290 and 360° C., in other embodiments, between 300 and 360° C., in other embodiments, between 300 and 350° C., in other embodiments, between 310 and 360° C., in other embodiments, and, in other embodiments, between 340 and 360° C.

The c-wood 26 is kept at an oxidation temperature or range of oxidation temperatures for a sufficient time (the "oxidation time") to permit some or all of the l-carbon 30 to separate and then volatilize to produce a porous carbon structure 32. In some embodiments, the oxidation time is greater than 1 hour. In other embodiments, the oxidation time is greater than 2 hours, in other embodiments, greater than 3 hours, in other embodiments, greater than 4 hours, in other embodiments, greater than 5 hours, in other embodiments, greater than 6 hours, and in other embodiments, greater than 7 hours. In some embodiments, the oxidation time is less than 8 hours. In other embodiments, the oxidation time is less than 7.5 hours, in other embodiments, less than 7 hours, in other embodiments, less than 6.5 hours, in other embodiments, less than 6 hours, in other embodiments, less than 4 hours, in other embodiments, less than 3 hours, and in other embodiments, less than 2 hours.

It has been found that by separating and removing the l-carbon 30 in a designed thermal heating process, the porous carbon structure 32 can be controlled in a desired manner. The structural change at the cross section area with increasing temperature from 300 to 350° C. clearly reveals the degradation of lignin lamella, See FIGS. 3A, B, and D. At 300° C., the cells are still tightly bonded to each other. A clear void boundary was observed with increasing oxidation temperature to 330° C., indicating the degradation of lignin lamella was initiated. The cells were completely separated from each other by further increasing temperature to 350° C. (See, FIG. 3D). These results confirmed C-lignin can be selectively degraded from carbonized wood by controlling oxidation temperature.

Besides the cell-cell adhesion area, the oxidation step creates structural change in carbonized cells of the c-wood. Through characterizing the surface morphology change by SEM. See FIG. 4A-I, the pore structure evolution can be seen by as the oxidation temperature is gradually increasing from 300 to 370° C. As can be seen from TEM image in FIG. 4G, the c-wood shows a relatively solid structure without pores. Within this temperature range, the surface morphology showed two distinct stages. One is the enrichment of nanoparticles on the surface as the oxidation temperature increases from 300 to 340° C.; and the other is vanishing of nanoparticles and leaving porous texture as the oxidation temperature increases from 350 to 370° C. At the first stage, it is obvious that certain material migrated out of the bulk carbon phase and aggregated on the surface in the form of spherical nanoparticles with uniform size of around 100 nm. See FIG. 4A-D. At the second stage, these nanoparticles were thermally degraded at higher oxidation temperatures to leave a relatively stable carbon framework at 370° C. (See FIG. 4E-F). Apparent surface cracks were observed at 370° C. compared to 360° C., are probably due to the partial degradation of carbon framework. At oxidation temperatures of 330° C. through 360° C., obvious mesopore structures are created. (See FIG. 3E-F). It is also worth mentioning that the pore structure was being created by nanoparticle migration, even though the surface morphology does not show clear porous texture, as shown in FIGS. 4B, 4H. It is also apparent that pore size increases at higher oxidation temperatures.

It has also been found that oxidation time plays a significant role in the pore structure evolution process. Similar nanoparticle migration and degradation was observed in c-wood with heating durations of 1, 3, 5, and 7 h at 350° C. With 1 h heating, the nanoparticles were migrated out and well distributed on the surface with 19% coverage. Most of the nanoparticles were degraded after 3 h of heating and only a few scarcely distributed nanoparticles remained. Focusing on the relatively smooth surface beneath the nanoparticles, small slit pores or cracks are observed. With further extending the heating time to 5 h, the slit pores grow bigger and the surface texture shows a particle chain structure with significant amounts of void spaces. These particle-chain structures are different from the aggregated nanoparticles observed at relative lower temperature, which can be attributed to the oxidized form of carbonized cellulose. With 7 h of heating, the chain structure becomes dominant, eventually forming an interpenetrating porous network.

It should be appreciated that because of its more amorphous structure, l-carbon is oxidized and volatilized before the c-carbon during the oxidation step. However, it has been found that thermal oxidation not only contributes to the degradation of less stable l-carbon component, it also contributes to gradual surface oxygenation of the more stable c-carbon component, which will also degrade eventually. (See, FIG. 5A) The degradation of a specific component depends on both heating temperature and time. For example, with 5 h of heating, 350° C. seemed sufficient to degrade the C lignin whereas not for C-cellulose, as shown in FIG. 5B. Increasing the temperature to 360 and 370° C., weight loss of >80% was observed indicating the degradation of C-cellulose, as shown in FIG. 5C. While keeping at 350° C. for longer time, e.g., 7 h, C-cellulose degradation was also observed. See FIG. 5A.

D. Optional a-MCHT Steps

In one or more embodiments, the porous carbon structures 32 obtained after the oxidation step described above may be activated by contacting them with an etching agent that removes portions of the c-carbon 28 (see etched areas 36 on FIG. 2), thereby increasing their overall surface area. The etching agent selected is not particularly limited provided that it has capable of etching c-carbon 28. In one or more embodiments, the etching agent is an oxidizer and may include, without limitation a base, an acid, or an oxidizing gas such as high temperature steam. (See FIG. 2).

In some embodiments, the etching agent is a strong oxidant base. In some embodiments, the etching agent is selected from KOH, zinc oxide, phosphoric acid, sodium hydroxide, calcium chloride, zinc chloride or combinations thereof In one or more embodiments, MCHT structures are activated using an aqueous etching solution containing a base, such as KOH, $ZnCl_2$ or NaOH, to form a-MCHT structures. In one or more of these embodiments, MCHT structures are first dispersed in an aqueous etching solution and stirred for from about 1 to about 24 hours at a temperature of from about 25° C. to about 100° C. In some embodiments, the mixture is stirred for from about 1 to about 20 hours. In some embodiments, the mixture is stirred for from about 1 to about 15 hours, in some embodiments, from about 1 to about 10 hours, from about 1 to about 8 hours, from about 2 to about 24 hours, from about 6 to about 24 hours, from about 10 to about 24 hours, from about 12 to about 24 hours, and from about 3 to about 12 hours. In some embodiments, the mixture is stirred for about 4 hours at a temperature of about 80° C.

In these embodiments, once the stirring is complete, the mixture is then kept static for from about 1 hours to about 24 hours. In some of these embodiments, the mixture is kept static for from about 1 hours to about 12 hours. In some of these embodiments, the mixture is kept static for from about 12 hours to about 24 hours. In some of these embodiments, the mixture is kept static for about 20 hours.

In one or more of these embodiments, the mixture may then be dried using any appropriate method known in the art. In some embodiments, the mixture may be dried at a temperature of from about 25° C. to about 150° C. for from about 1 hours to about 24 hours. In some of these embodiments, the mixture may be dried at a temperature of from about 25° C. to about 125° C., in some embodiments, from about 25° C. to about 100° C., in some embodiments, from about 25° C. to about 75° C., in some embodiments, from about 50° C. to about 150° C., in some embodiments, from about 75° C. to about 150° C., and in some embodiments, from about 100° C. to about 150° C. In some of these embodiments, the mixture may be dried for from about 1 hours to about 18 hours. In some of these embodiments, the mixture may be dried for from about 1 hours to about 12 hours. In some of these embodiments, the mixture may be dried for from about 6 hours to about 18 hours. In some embodiments, the mixture may be dried at a temperature of about 120° C. for about 12 hours.

Once dried, etching agent treated MCHT structures are heated in a nitrogen or other inert gas atmosphere to a temperature of from about 500° C. to about 1500° C. for from about 1 hours to about 6 hours. In some of these embodiments, the etching agent treated MCHT structures are heated to a temperature of from about 500° C. to about 1250° C. In some of these embodiments, the etching agent treated MCHT structures are heated to a temperature of from about 500° C. to about 1000° C. In some of these embodiments, the etching agent treated MCHT structures are heated to a temperature of from about 700° C. to about 1500° C. In some of these embodiments, the etching agent treated MCHT structures are heated to a temperature of from about 900° C. to about 1500° C. In some of these embodiments, the etching agent treated MCHT structures are heated to a temperature of from about 700° C. to about 1200° C. In some of these embodiments, the etching agent treated MCHT structures are heated for from about 1 hours to about 5 hours. In some of these embodiments, the etching agent treated MCHT structures are heated for from about 1 hours to about 3 hours. In some of these embodiments, the etching agent treated MCHT structures are heated for from about 2 hours to about 5 hours. In some of these embodiments, the etching agent treated MCHT structures are heated for from about 2 hours to about 4 hours. In some of these embodiments, the etching agent treated MCHT structures are heated in a nitrogen or other inert gas atmosphere to a temperature of about 700 for about 2 hours.

In some of these embodiments, the etching agent treated MCHT structures are then heated in a nitrogen (or other inert gas) atmosphere from a first temperature of from about 25° C. to about 50° C. to a second temperature of from about 500° C. to about 1500° C. at a rate of from about 5° C. $min^{-1}$. In some of these embodiments, etching agent treated MCHT structures are heated at a rate of from about 10° C. $min^{-1}$. In some of these embodiments, etching agent treated MCHT structures are heated at a rate of from about 15° C. $min^{-1}$. In some of these embodiments, etching agent treated MCHT structures are heated at a rate of from about 20° C. $min^{-1}$. In some of these embodiments, etching agent treated MCHT structures are heated in a nitrogen (or other inert gas) atmosphere from a first temperature of about 25° C. to a second temperature of about 700° C. at a rate of from about 20° C. $min^{-1}$.

In these embodiments, the etching agent treated MCHT structures are then cooled to ambient temperature and then rinsed and filtered with DI water until the rinsing DI water has a neutral pH. The mixture is dried again as set forth above, to provide an etching agent treated a-MCHT structure.

As set forth above, the porous carbon structures of the present invention may also be activated (i.e. etched) with an acid or other non-alkaline oxidizer, such as phosphoric acid, nitric acid, sulfuric acid, or hydrogen peroxide. In one or more of these embodiments, the c-wood is first impregnated with an acid solution. In some of these embodiments, the c-wood is impregnated by soaking it in an acid solution and magnetically stirring for 3 hours. In these embodiments, an acid solution and c-wood are combined and the mixture heated to a temperature of from about 50° C. to about 100° C. It is maintained at that temperature a period of time sufficient to ensure the access of acid to the interior of the c-wood. Then the impregnated precursors are then carbonized under inert gas at temperature between 200° C. to about 1000° C. for from about 1 to about 5 hours, to produce an activated porous carbon structure. The activated porous carbon structure allowed to cool and then washed with distilled water until the rinsing water is neutral.

As set forth above, the porous carbon structures of the present invention may also be activated by contacting them with a high temperature oxidizing gas. In these embodiments, the porous carbonized products are activated by exposing them oxidizing gases, such as steam, carbon dioxide or both that have been heated to temperature of from about 500° C. to about 1200° C. for a period of from about 1 to about 10 hours.

E. r-MCHT Steps

In some other embodiments, the porous carbon structures of the present invention, whether or not activated, may be annealed in a nitrogen (or other inert gas) atmosphere to produce a porous carbon structure having excellent electrical properties. Unless otherwise indicated, where either MCHT or a-MCHT is the porous carbon structures, the resulting structure will be referred to herein as r-MCHT. In some of these embodiments, the porous carbon structures are annealed in a nitrogen (or other inert gas) atmosphere at a temperature of from about 500° C. to about 1500° C. for from about 1 hours to about 6 hours. In one or more embodiments, the porous carbon structures may be annealed in a nitrogen (or other inert gas) atmosphere at a temperature of from about 500° C. to about 1250° C. In some embodiments, the porous carbon structures may be annealed in a nitrogen (or other inert gas) atmosphere at a temperature of from about 500° C. to about 1000° C., in some embodiments, a temperature of from about 500° C. to about 900° C., in some embodiments, a temperature of from about 600° C. to about 1500° C., in some embodiments, a temperature of from about 700° C. to about 1500° C., in some embodiments, a temperature of from about 700° C. to about 1250° C., and in some embodiments, a temperature of from about 700° C. to about 1000° C.

In some of these embodiments, the porous carbon structures may be annealed for from about 1 hours to about 6 hours. In some of these embodiments, the porous carbon structures may be annealed for from about 1 hour to about 5 hours. In some of these embodiments, the porous carbon structures may be annealed for from about 1 hours to about 3 hours. In some of these embodiments, the porous carbon structures may be annealed for from about 2 hours to about 6 hours. In some of these embodiments, the porous carbon structures may be annealed for from about 4 hours to about 6 hours. In some of these embodiments, the porous carbon structures may be annealed for from about 2 hours to about 4 hours. In some of these embodiments, the porous carbon structures may be annealed at a temperature of from about 700° C. for about 2 hours.

IV. Properties

The porous carbon structures of the present invention, including but not limited to MCHT, a-MCHT, and r-MCHT comprises a plurality of pores having a diameter of from 2 nm or more to 30 nm or less. In some embodiments, porous carbon structures of the present invention may comprise a plurality of pores having a diameter of from 2 nm or more to 50 nm or less. In some embodiments, porous carbon structures of the present invention may comprise a plurality of pores having a diameter of from 2 nm or more to 30 nm or less. In some embodiments, porous carbon structures of the present invention may comprise a plurality of pores having a diameter of from 2 nm or more to 20 nm or less. In some embodiments, porous carbon structures of the present invention may comprise a plurality of pores having a diameter of from 10 nm or more to 70 nm or less. In some embodiments, porous carbon structures of the present invention may comprise a plurality of pores having a diameter of from 20 nm or more to 50 nm or less. In some embodiments, porous carbon structures of the present invention may comprise a plurality of pores having a diameter of from 30 nm or more to 50 nm or less. In some embodiments, the porous carbon structures of the present invention may have a mesoporous structure, having an average pore diameter for from 2 to 50 nm.

In various embodiments, the porous carbon structures of the present invention, including but not limited to MCHT, a-MCHT, and r-MCHT, have a surface area of from about 500 $m^2/g$ to about 3500 $m^2/g$ as measured by surface analyzer with liquid nitrogen at 77° K. In some embodiments, the porous carbon structures of the present invention have a surface area as measured by surface analyzer with liquid nitrogen at 77° K of from about 500 $m^2/g$ to about 3000 $m^2/g$, in some embodiments, from about 500 $m^2/g$ to about 2500 $m^2/g$, in some embodiments, from about 500 $m^2/g$ to about 2000 $m^2/g$, in some embodiments, from about 500 $m^2/g$ to about 1800 $m^2/g$, in some embodiments, from about 500 $m^2/g$ to about 1200 $m^2/g$, in some embodiments, from about 700 $m^2/g$ to about 3500 $m^2/g$, in some embodiments, from about 900 $m^2/g$ to about 3500 $m^2/g$, in some embodiments, from about 1200 $m^2/g$ to about 3000 $m^2/g$, in some embodiments, from about 1700 $m^2/g$ to about 3500 $m^2/g$, in some embodiments, from about 2000 $m^2/g$ to about 3500 $m^2/g$, in some embodiments, from about 700 $m^2/g$ to about 2500 $m^2/g$, and in some embodiments, from about 900 $m^2/g$ to about 2200 $m^2/g$.

The highly porous structure and large surface area of the porous carbon structures of the present invention provide excellent adsorption properties as measured by isothermal adsorption with methylene blue (MB) and methylene orange (MO) dye. In one or more embodiments, the porous carbon structures of the present invention provide an isothermal adsorption capacity for MB of from about 300 mg/g to about 850 mg/g. In some embodiments, the isothermal adsorption capacity for MB may be from about 300 mg/g to about 700 mg/g, in some embodiments, about 300 mg/g to about 600 mg/g, in some embodiments, about 400 mg/g to about 850 mg/g, in some embodiments, about 500 mg/g to about 850 mg/g, in some embodiments, about 650 mg/g to about 850 mg/g, in some embodiments, about 450 mg/g to about 600 mg/g. In one or more embodiments, the isothermal adsorption capacity for MO may be from about 100 mg/g to about 300 mg/g. In some embodiments, the adsorption capacity for MO may be from about 100 mg/g to about 250 mg/g, in some embodiments, about 100 mg/g to about 200 mg/g, in some embodiments, about 150 mg/g to about 300 mg/g, in some embodiments, about 200 mg/g to about 300 mg/g, in some embodiments, about 150 mg/g to about 250 mg/g.

As set forth above, thermal reduction in $N_2$ of the porous carbon structures of the present invention provides structures with excellent electrical properties. In one or more embodiments, the porous carbon structures of the present invention have a capacitance of from about 100 F/g to about 250 F/g at a voltage scan rate of 2 mV/s. In some embodiments, the porous carbon structures of the present invention have a capacitance of from about 100 F/g to about 225 F/g, in some embodiments, from about 100 F/g to about 200 F/g, in some embodiments, from about 100 F/g to about 175 F/g, in some embodiments, from about 125 F/g to about 250 F/g, in some embodiments, from about 150 F/g to about 250 F/g, in some embodiments, from about 175 F/g to about 250 F/g, in some embodiments, from about 200 F/g to about 250 F/g, and in some embodiments, from about 125 F/g to about 225 F/g. In one or more embodiments, the porous carbon structures of the present invention have a capacitance of about 200 F/g at a voltage scan rate of 2 mV/s.

In sum, the present invention provides a template-free approach to synthesize mesoporous carbon structures by using natural wood as the carbon precursor. A large surface area of can be achieved by only thermal treatment without introducing any chemicals, and dramatically increases with activation. These porous carbons with ultrahigh surface area show outstanding organic dye adsorption property (MB and MO) and an unprecedented high adsorption capacity has been achieved with MB adsorbate. After thermal reduction, the porous carbon could serve as supercapacitor electrode for electrochemical energy. Taking advantage of the hierarchical microtube/mesopore feature, these materials could find wider applications in adsorption, energy storage/conversion and catalysis.

In light of the foregoing, it should be appreciated that the present invention significantly advances the art by providing a method of making high surface area mesoporous carbon (as well as novel mesoporous carbon hollow tube (MCHT) structures made thereby) that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Materials

Wood sample was collected from SPF lumber (Spruce, Pine, Fir). Potassium hydroxide (KOH) pellet was purchased from EMD chemicals. Methylene blue (MB) and methyl orange (MO) were purchased from Fisher Scientific. N,N-dimethylformamide (DMF) and polyvinylidene fluoride (PVDF) were purchased from Sigma Aldrich. All chemicals were used as-received without further treatment.

Characterization

Thermal stability of raw wood and c-wood was studied by thermogravimetric analysis (TGA, TA instrument Q500) in air atmosphere from 20° C. to 800° C. with a ramp rate of 10° C. min-1. The morphology of c-wood, MCHT and a-MCHT were characterized by scanning electron microscopy (SEM, JEOL-7401). Transmission electron microscopy (TEM) images of MCHT and a-MCHT were obtained by JEOL JEM-1230 microscope operated at 120 kV. Samples for TEM observation were prepared by drying a drop of sample powder ethanol suspension on carbon-coated copper TEM grids. X-ray photoelectron spectroscopy (XPS) was accomplished using a PHI VersaProbe II Scanning XPS Microprobe with Al Kα line excitation source. Brunaure-Emmet-Teller (BET) surface area analysis of samples was performed using a TriStar II 3020 surface analyzer (Micromeritics Instrument Corp., USA) by $N_2$ adsorption-desorption isotherms. UV-1601 Shimadzu spectrophotometer was used to determine the dye concentration in adsorption test. The surface charge of MCHT and a-MCHT in neutral deionized water was measured by Zetasizer Nano-ZS90 (Malvern).

Thermal Gravitational Analysis of Raw Wood and c-Wood

Figure 6A:
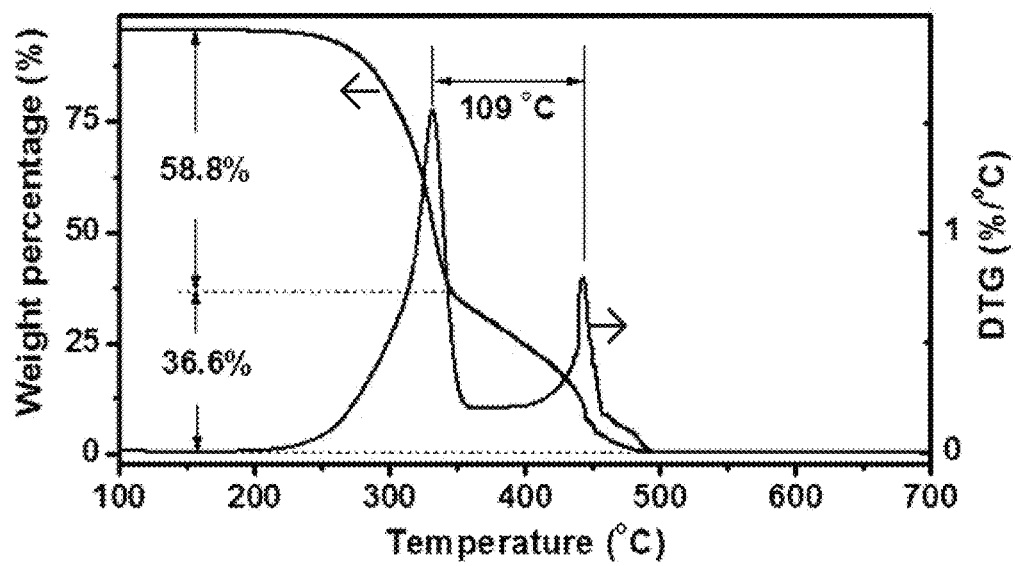
FIG. 6A-B are a graphs comparing the thermal gravitational analysis (TGA) and differential thermogravimetry (DTG) curves of raw wood (FIG. 6A) and carbonized wood (FIG. 6B).
Figure 6B:
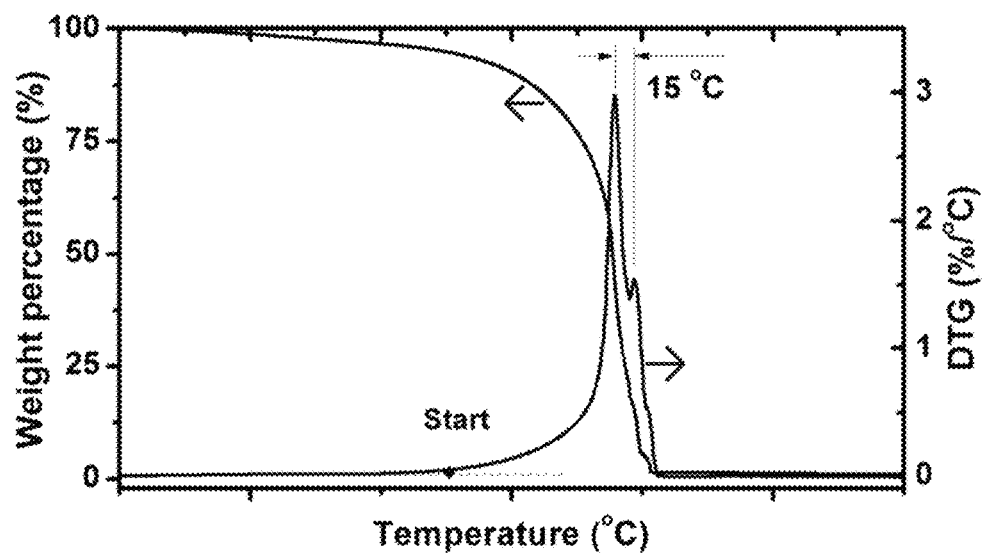
Figure 7A:
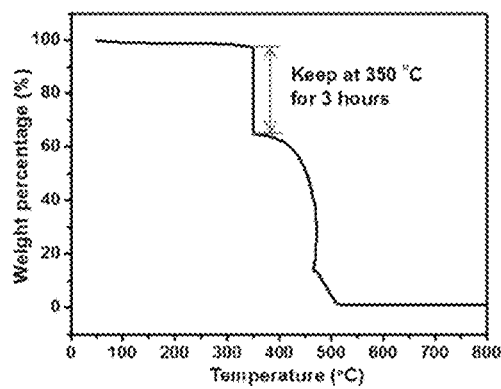
FIGS. 7A-B are programmed thermal oxidation curves of c-wood in air showing weight loss-temperature profile (FIG. 7A), weight loss-time profile (FIG. 7B) for a heating program that: started at room temperature: ramped up from room temperature to 350° C. at a rate of 5° C./min; was kept at 350° C. for 3 hours and then ramped from 350° C. to 800° C. at a rate of 5° C./min.
Figure 7B:
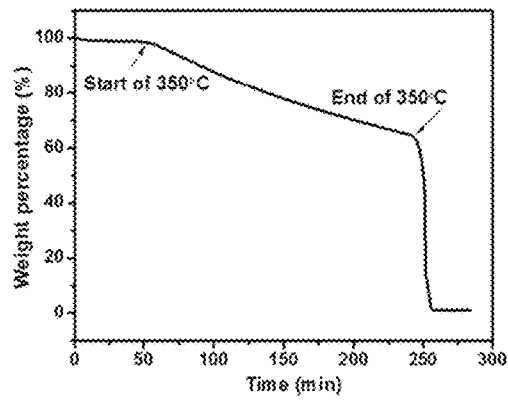

Thermal gravitational analysis was conducted on raw wood and c-wood in air at a heating rate of 10° C./min. See FIGS. 6A-B. FIG. 6A shows the TG and DTG curves of raw wood that gives two major degradation peaks ($T_{peak}$) at 332 and 441° C. corresponding to the degradation of cellulose and lignin, respectively. The 109° C. higher degradation temperature of lignin is primarily due to its having a larger molecular weight than cellulose. Generally, hemicelluloses are of much lower molecular weight than cellulose and thus a broadened shoulder is observed at the left side of first DTG peak. The weight loss of 58.5 and 36.6 wt % in each stage well corresponds to mass fraction of cellulose/hemicellulose and lignin in natural wood. In c-wood, two partially overlapped $T_{peak}$ at 480 and 495° C. are present representing the degradation of l-carbon and c-carbon, respectively. Because of the amorphous nature of lignin, l-carbon degrades at lower temperature than that of c-carbon, which will be further confirmed by following programmed TGA and microstructure study. Even though the two $T_{peak}$ are close to each other, the slight difference in between provides room to remove relatively volatile l-carbon by simply oxidation in air. By heating at the starting decomposition temperature of l-carbon at 350° C. for 3 hours, 35% of total weight was successfully removed from the wood. (See, FIGS. 7A-B) The weight loss fraction is consistent with the lignin composition in natural wood, which confirms the decomposition of l-carbon at relatively lower temperature.

Preparation of MCHT, a-MCHT and r-MCHT

MCHT was prepared in two consecutive thermal treatment steps: carbonization and oxidation. First, raw wood was carbonized in $N_2$ atmosphere at 800° C. for 2 hours with a heating rate of 5° C. min-1. Then the carbonized wood was further oxidized in air at 350° C. for 3 hours with a heating rate of 5° C. min-1. To obtain a-MCHT, 1.0 g MCHT was dispersed in 40 mL (0.25 g/mL) KOH aqueous solution and the mixture was stirred at 80° C. for 4 hours and then kept in static for 20 hours. After dried at 120° C. for 12 hours, the mixture was then heated at 700° C. for 2 hours with a heating rate of 20° C. min-1 in nitrogen atmosphere. After cooling down to room temperature, the mixture was washed and filtered with DI water until the rinsing water is neutral and then dried again at 120° C. for 12 hours. r-MCHT was obtained by thermal reduction of MCHT in $N_2$ atmosphere at 800° C. for 2 hours.

Figure 3A:
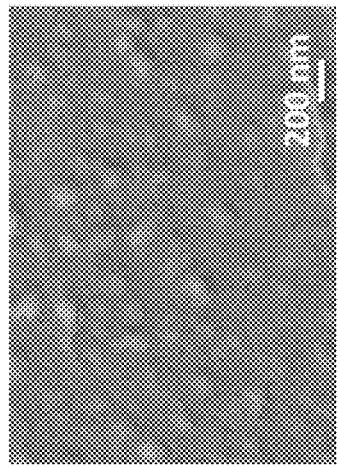
FIGS. 3A-F are SEM or TEM images of c-wood and MCHT structures according to various embodiments of the present invention.
Figure 3B:
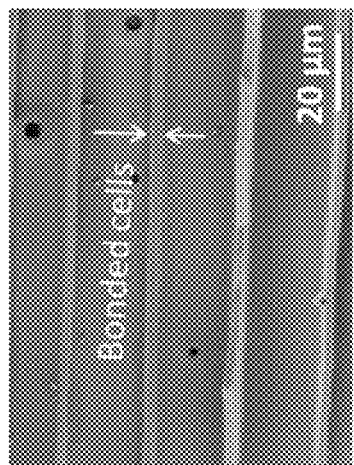
Figure 3C:
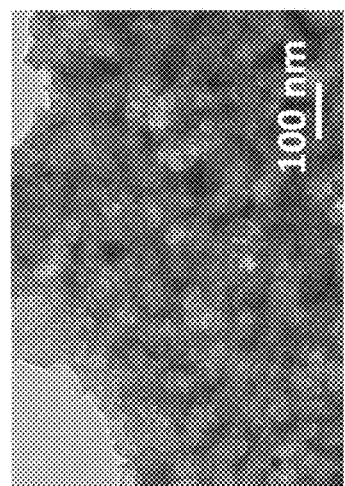
Figure 3D:
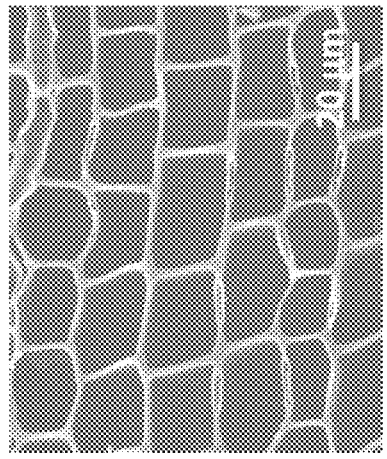
Figure 3E:
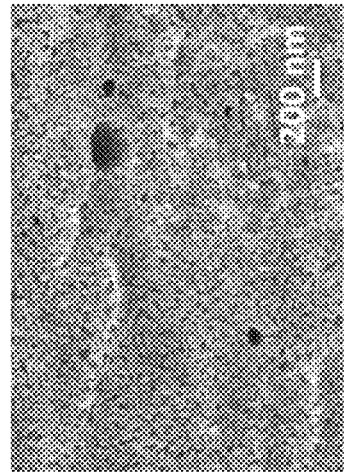
Figure 3F:
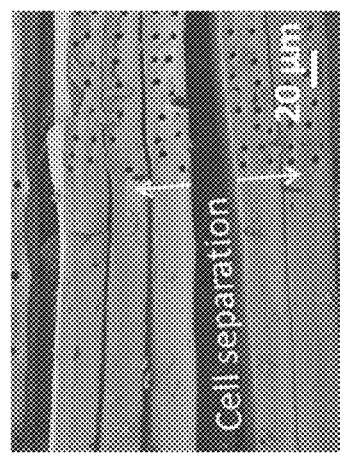
Figure 4A:
FIGS. 4A-I are SEM images of the surface microstructure of carbonized wood after thermal oxidation at MC-300 (FIG. 4A), MC-330 (FIG. 4B), MC-340 (FIG. 4C), MC-350 (FIG. 4D), MC-360 (FIG. 4E), and MC-370 (FIG. 4F) and TEM images of the surface microstructure of C-800 (FIG. 4G), MC-330 (FIG. 4H), and MC-360 (FIG. 4I).
Figure 4B:
Figure 4C:
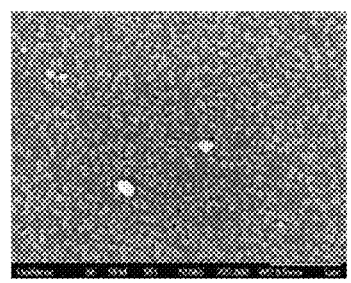
Figure 4D:
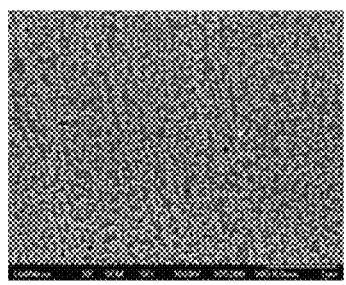
Figure 4E:
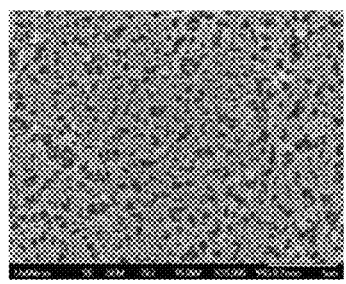
Figure 4F:
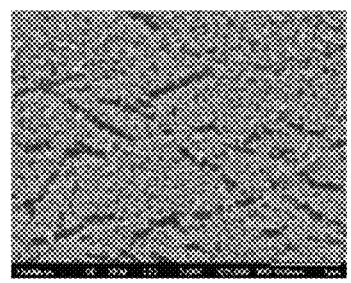
Figure 4G:
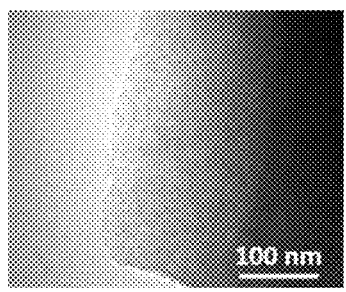
Figure 4H:
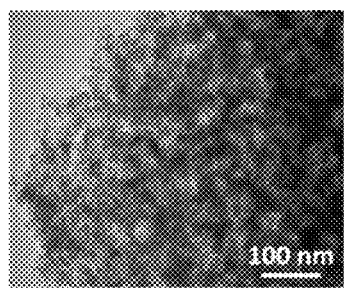
Figure 4I:
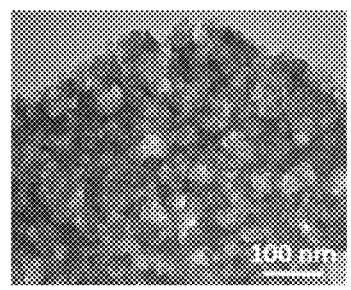
Figure 8:
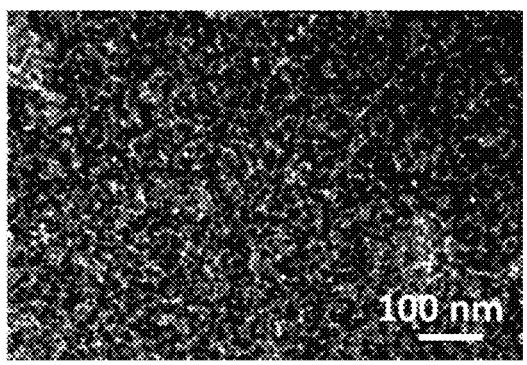
FIG. 8 is a TEM image of MCHT showing the porous structure with inter-weaved surface texture.

FIG. 3A-F shows the microstructure of a representative sample of c-wood before and after thermal oxidation at 350° C., as characterized by SEM and TEM. The tubular cell structure is maintained after carbonization at 800° C. and all the cells are closely adhered to each other, as shown in FIG. 3A. Side view of the c-wood in FIG. 3B reveals its solid structure with a few micrometer-sized pores. These pores are inherent structure of natural wood for inter-cell mass transportation. The magnified side-view of c-wood shows pore-free surface texture with distributed convex particles with size of 50-100 nm, which is known collectively as the warty layer (lignin like structure), as shown in FIG. 3C. After thermal oxidation in air at 350° C. for 3 hours, the tubular cells are separated from each other, (see FIG. 3D), which can be attributed to the degradation of lignin "glue" in between the cells. This result again confirms the earlier degradation of l-carbon than c-carbon in TGA study. (See, FIG. 6B). More importantly, porous structure was observed on the wall of tubular cell due to the removal of l-carbon, FIG. 3E. TEM image in FIG. 3F clearly shows the penetrating pore structure throughout the cell wall rather than just on the surface, which is essential to achieve large surface area. Focusing on the surface of MCHT, a three dimensional inter-weaved nanofibrous structure is observed reflecting the cellulose skeleton structure in wood. See FIG. 8.

Figure 9A:
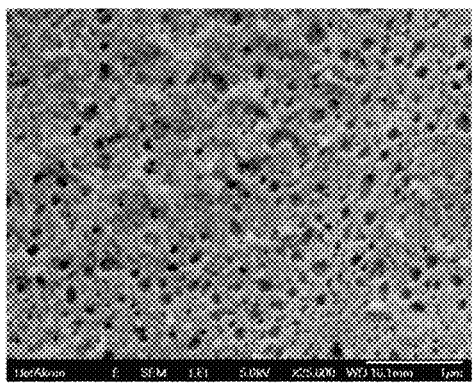
FIGS. 9A-B are SEM images of a-MCHT at low magnification (FIG. 9A) and high magnification (FIG. 9B).
Figure 9B:
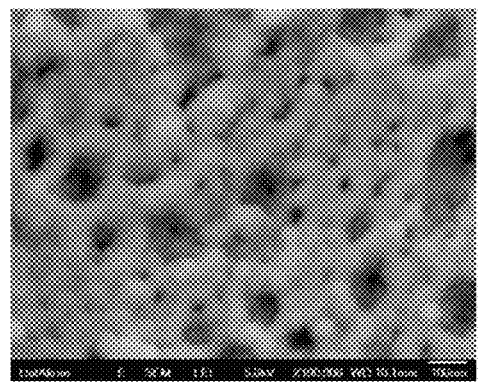
Figure 11A:
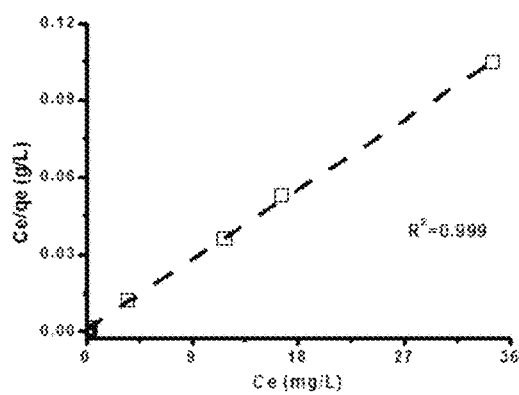
FIGS. 11A-D are graphs showing isothermal adsorption of MCHT with MB (MCHT-MB) (FIG. 11A), MCHT with MO (MCHT-MO) (FIG. 11B), a-MCHT with MB (a-MCHT-MB) (FIG. 11C) and a-MCHT with MO (a-MCHT-MO) (FIG. 11D) fitted with Langmuir model.
Figure 11B:
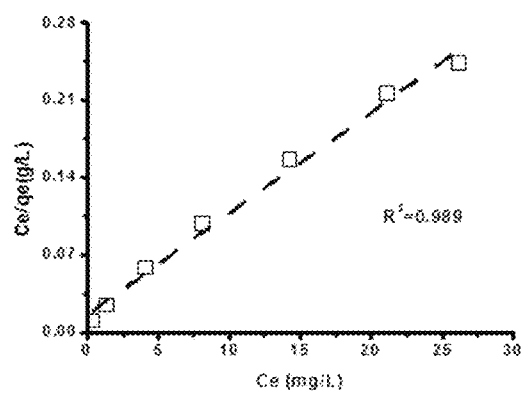
Figure 11C:
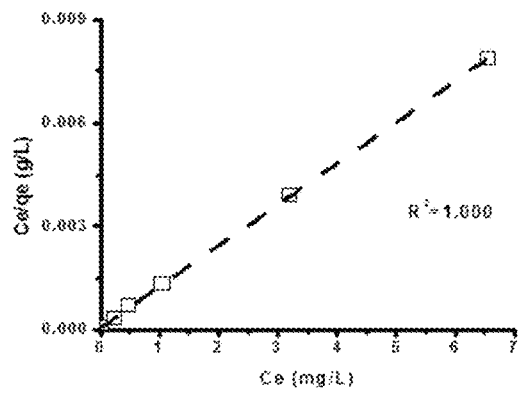
Figure 11D:
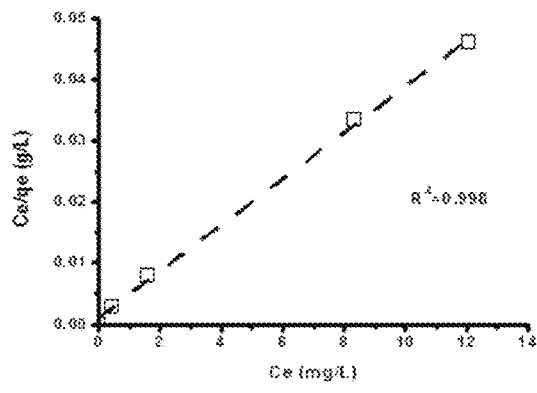
Figure 12A:
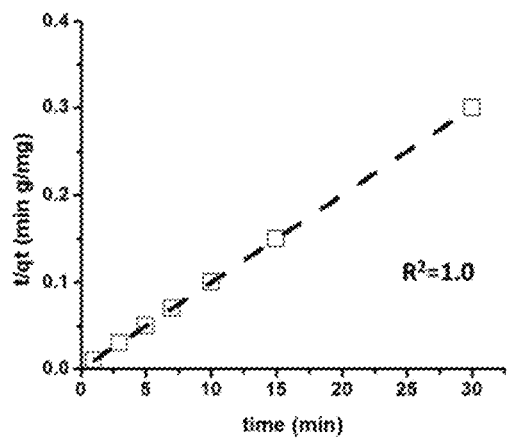
FIGS. 12A-D are graphs showing translated kinetic adsorption t/qt~t plots of MCHT with MB (MCHT-MB) (FIG. 12A), MCHT with MO (MCHT-MO) (FIG. 12B), a-MCHT with MB (a-MCHT-MB) (FIG. 12C) and a-MCHT with MO (a-MCHT-MO) (FIG. 12D) fitted with pseudo-second-order model. Initial concentration of MB and MO are 50 ppm.
Figure 12B:
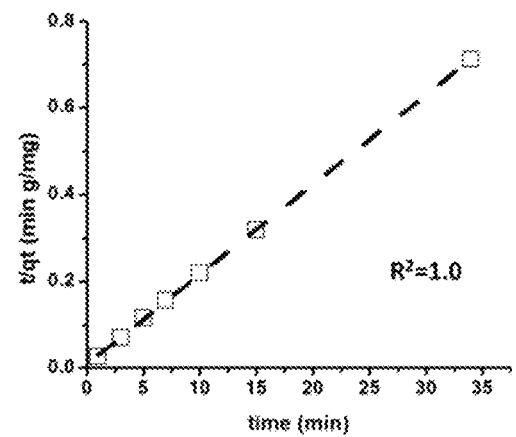
Figure 12C:
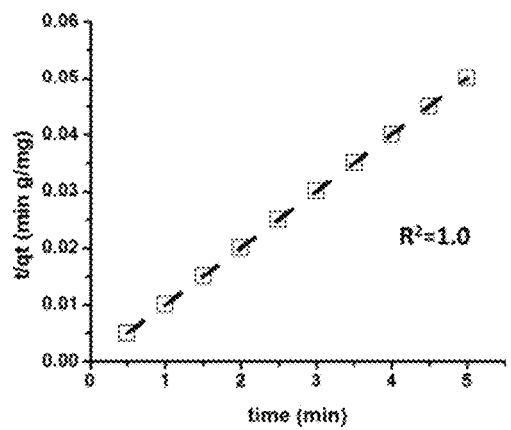
Figure 12D:
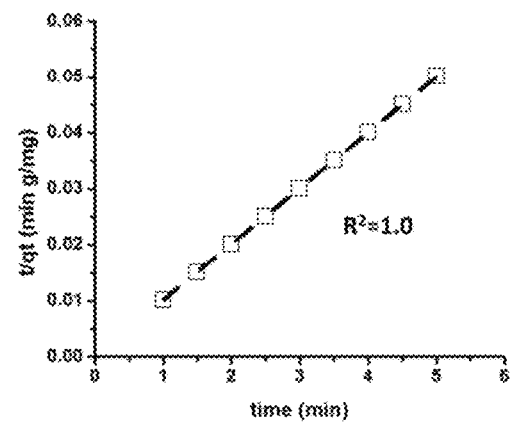
Figure 15:
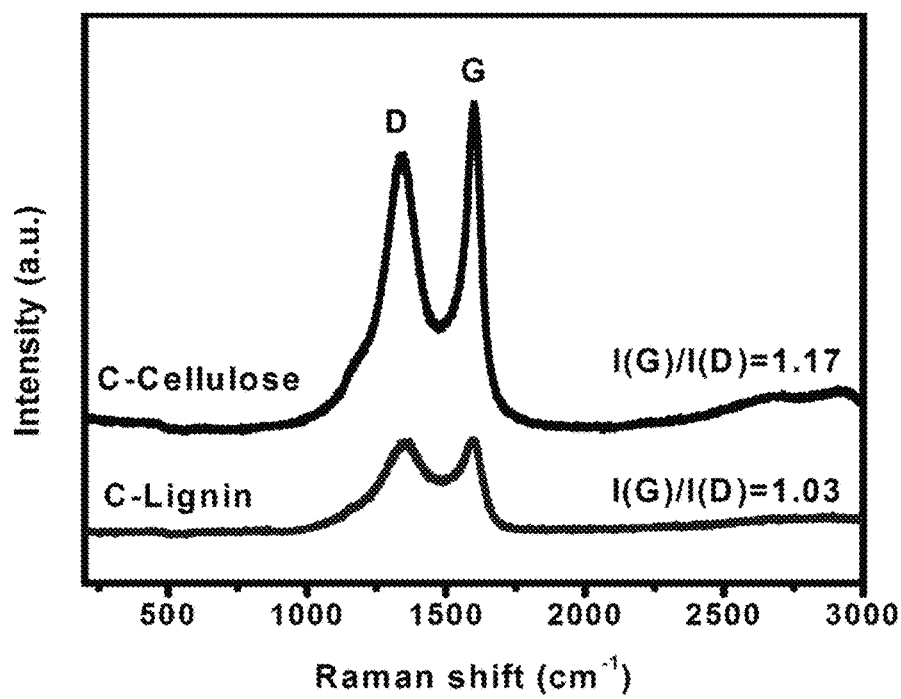
FIG. 15 is a graph showing Raman spectrum of carbonized cellulose (C-Cellulose) and carbonized lignin (C Lignin).

As can be seen in FIGS. 9A-B, the fibrous structure becomes more closely packed to form smaller pore structures after activation by KOH. $N_2$ adsorption-desorption isotherm were performed on MCHT and a-MCHT to determine their pore size and surface area. FIG. 10 shows the typical type IV curves for both MCHT and a-MCHT. The hysteresis loop of a-MCHT closed at lower relative pressure due to the enhanced pore connectivity after activation. The BJH pore size distribution curves are presented as inset figure of FIG. 10. Both MCHT and a-MCHT show narrow pore size distribution with radius of ~2.0 nm. The chemical activation generates smaller micropores in a-MCHT evidenced by the uplifted curve shoulder below 2 nm. Therefore, smaller average pore radius of 1.5 nm is obtained in a-MCHT than that of 2.4 nm in MCHT. The BET surface area of MCHT and a-MCHT reaches 1094 and 2925 m2/g, respectively, which is significantly higher than most of the commercially available activated carbon and template-synthesized mesoporous carbons. Besides the larger surface area, thermal oxidation and activation change the surface property significantly. XPS study reveals that the total fraction of oxygen-containing groups (C—O, C=O and O—C=O) increases from 14.08% (c-wood) to 19.59 and 20.15% after oxidation (MCHT) and activation (a-MCHT) respectively, refer to See FIG. 15 and Table 1 below. The enriched surface oxygen-containing groups play an essential role in adsorption which has been demonstrated in following adsorption study with organic dye molecules as adsorbate.

TABLE 1

Summary of C1s peak fit results

|  | sp2 | sp3 | C—O | C=O | O—C=O | Total O group |
|---|---|---|---|---|---|---|
| c-wood | 27.01 | 58.91 | 7.11 | 1.39 | 5.58 | 14.08 |
| MCHT | 27.27 | 53.14 | 7.25 | 12.02 | 0.32 | 19.59 |
| a-MCHT | 23.48 | 56.37 | 12.50 | 1.14 | 6.51 | 20.15 |

Adsorption Testing

Isotherm adsorption was performed to determine the adsorption capacity. Specifically, 0.5 g/L of MCHT and a-MCHT were used to treat 10 mL MB and MO solutions with different initial concentrations for 12 hours. For kinetic studies, 0.5 g/L of MCHT and a-MCHT were used to treat 50 ppm MB or MO solutions. For MCHT, 2.0 mL mixtures were collected and filtered for UV-Vis tests at 1, 3, 5, 7, 10, 15 and 30 minutes. Due to the faster adsorption nature, sample collection time was every 30 seconds up to 5 minutes for a-MCHT.

The adsorption capacity of both MCHT and a-MCHT for methylene blue (MB) and methyl orange (MO) was tested by isotherm adsorption at room temperature and the results are shown in FIG. 11A-D. The $C_e/q_e$~$C_e$ plots show highly linear feature with correlation factors ($R^2$) larger than 0.98. Ce is dye concentration in the remaining solution (mg/L) at equilibrium and $q_e$ is the amount of dye adsorbed onto adsorbent (mg/g) at equilibrium. The isotherm adsorption results were fitted with Langmuir isotherm model in Equation (1):

$$\frac{C_e}{q_e} = \frac{1}{bq_0} + \frac{C_e}{q_0} \quad (1)$$

where $q_0$ is the adsorption capacity (mg/g) of adsorbent and b is the Langmuir adsorption constant related to the binding energy of the adsorption (L/mg). $q_0$ and b can be determined from the slope and interception in linear fitted $C_e/q_e$~$C_e$ plot. By using Langmuir model, the adsorption capacity of MCHT for MB and MO was calculated as 330 and 106 mg/g. After further activation, the a-MCHT showed ultra-high adsorption capacity of 794 and 256 mg/g for MB and MO, respectively. As presently informed, this is the highest MB adsorption capacity that has been achieved in carbon based materials. Both MCHT and a-MCHT show about two-times larger capacity in MB adsorption than in MO adsorption, which may be attributed to the electrostatic attraction between positively charge MB molecules and negatively charged adsorbent surface. The surface charge of MCHT and a-MCHT was measured as −31.7 and −31.4 mV. The strong interaction between MB and adsorbent was further demonstrated by the larger b value of 5.05 and 52.94 for MCHT and a-MCHT, respectively. While b value for MO on MCHT and a-MCHT was only 0.79 and 4.33, indicating a weak adsorbate/adsorbent interaction.

To quantify the corresponding adsorption rate for the porous carbon structures of the present invention, kinetic adsorption tests were performed at room temperature with both MCHT and a-MCHT. The kinetic results were then used to fit with different kinetic models including pseudo-first-order, pseudo-second order, elovich, and interaparticle diffusion. The formulas and parameters of the four kinetic models are provided in Table 2.

TABLE 2

The formula and parameters of different kinetic models

| Models | Equation | Parameters | |
|---|---|---|---|
| Pseudo-first-order | $\log(Q_e - Q_t) = \log Q_e - \frac{k_1}{2.303}t$ | $k_1$ | rate constant, min$^{-1}$ |
|  |  | $Q_e$ | adsorption capacity at equilibrium, mg g$^{-1}$ |
| Pseudo-second-order | $\frac{t}{q_t} = \frac{1}{k_{ad}q_e^2} + \frac{t}{q_e}$ | $k_{ad}$ | rate constant, g mg$^{-1}$ min$^{-1}$ |
|  |  | $Q_e$ | adsorption capacity at equilibrium, mg g$^{-1}$ |
|  |  | h | the initial adsorption rate at t approaching zero, mg g$^{-1}$ min$^{-1}$ |
| Elovich | $Q_t = \frac{1}{\beta}\ln(\alpha\beta) + \frac{1}{\beta}\ln(t)$ | α | initial adsorption rate, mg g$^{-1}$ min$^{-1}$ |
|  |  | β | desorption constant, g mg$^{-1}$ |
|  |  | $Q_t$ | solid-phase loading of adsorbate in the adsorbent at time t, mg g$^-$ |
| Intraparticle diffusion | $Q_t = k_{dif}t^{0.5} + C$ | $k_{dif}$ | rate constant, mg g$^{-1}$ min$^{-0.5}$ |
|  |  | C | the thickness of the boundary layer, mg g$^{-1}$ |

The correlation coefficient ($R^2$) was used to evaluate the suitability of each model and the higher $R^2$ value indicates a more applicable model. Among these models, pseudo-second order acquires the highest $R^2$, which can be expressed in Equation (2):

$$\frac{t}{qt} = \frac{1}{k_{ad}q_e^2} + \frac{t}{q_e} \qquad (2)$$

where $q_t$ (mg g$^{-1}$) is the solid-phase loading of dye in adsorbent at time t (min.), $q_e$ (mg g$^{-1}$) is the adsorption capacity at equilibrium, $k_{ad}$ (g mg$^{-1}$ min$^{-1}$) is the rate constant of adsorption and h (mg g$^{-1}$ min$^{-1}$) is the initial adsorption rate at t approaching zero, $h=k_{ad}q_e^2$. The transformed $t/q_t$–t plots show highly linear feature with $R^2$ values approach/equal to 1, (see, FIGS. 12A-D), indicating a good fitting with pseudo-second order model. The regression results are summarized in Table 3, below. The lower $q_e$ value than that of $q_0$ obtained from isotherm study was likely due to the diffusion restricted adsorption in micropore area within a short time of 30 min. By comparing the ratio of $q_e/q_0(100/330)=0.30$ and $S_{External}/S_{Total}(341/1094)=0.31$ for MB on MCHT adsorbent, it is surprising to find a highly consistent relationship between them since adsorption capacity is ordinarily highly dependent on the effective surface area. That being said, the adsorption majorly occurred at the external surface (including mesopore surface) rather than micropore surface within the limited kinetic adsorption process. The adsorption in micropore surface would occur by extending adsorption time. For examples, the adsorption capacity reaches to 330 mg/g with 12 hours adsorption from isotherm study. The lower $q_e$ value for MO on MCHT is attributed to the extremely low adsorption rate of 0.046 g mg$^{-1}$ min$^{-1}$. After activation, a-MCHT shows doubled and 13.5 times higher rate constant in MB and MO adsorption as compared to MCHT indicating the adsorbate uptake is less restricted by the adsorption rate. Thus, similar $q_e$ values of 100.0 and 100.1 g mg$^{-1}$ min$^{-1}$ were observed. However, the BET results indicate a 4.7 times larger external surface area after activation, which actually does not change $q_e$ in a similar linear increase manner. These results again confirm that the enhanced surface area after activation is majorly created by the newly formed micropores where dye adsorption is kinetically restricted in a limited adsorption time.

reported materials. Using this simple method, the a-MCHT achieves 2-5 times larger surface area than template synthesized mesoporous carbon.

It is not necessary true that a larger surface area leads to a larger MB adsorption capacity. For example, activated carbon prepared from rattan sawdust has a hundred times larger surface area of than that made from dehydrated wheat bran carbon, but shows a lower MB adsorption capacity. All these results reveal that not only specific surface area, but also the pore size and surface property contribute to the final adsorption property. The ultrahigh surface area of a-MCHT together with its abundant surface functional groups ensures an extremely large adsorption capacity in this study.

Electrochemical Testing

Figure 14A:
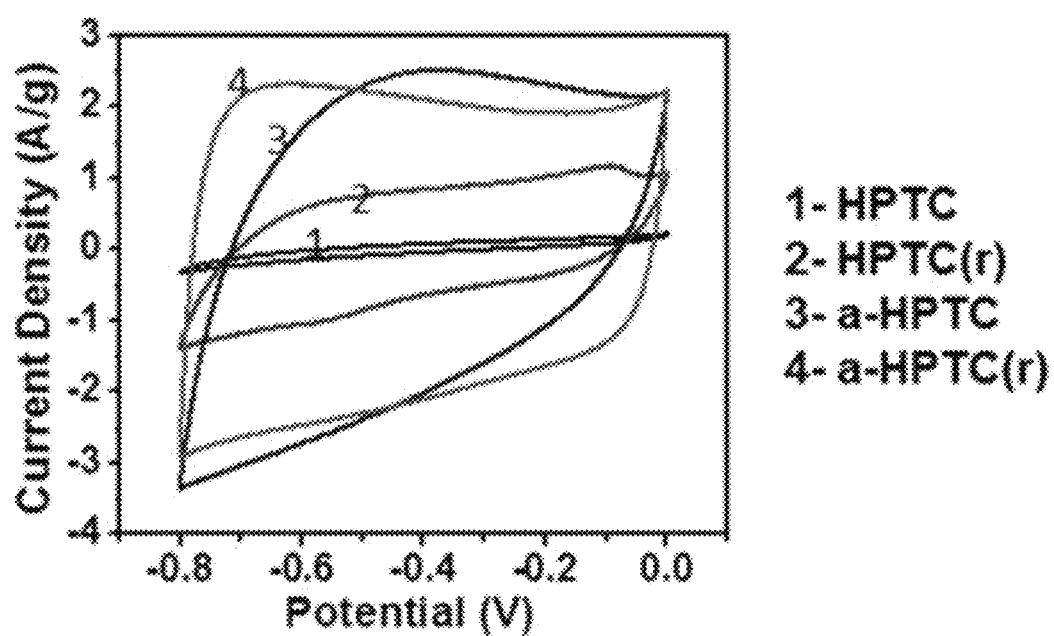
FIGS. 14A-D are graphs showing cyclic voltammograms (CV) at scan rate of 10 mV/s (FIG. 14A), capacitance vs. scan rate (FIG. 14B), electrochemical impedance spectroscopy (EIS) results (FIG. 14C), and cycling retention over 5000 cycles (FIG. 14D) using HPTC (MCHT), HPTC-r (MCHT(r)), a-HPTC (a-MCHT), and aHPTC(r) (a-MCHT (r)) as electrodes.
Figure 14B:
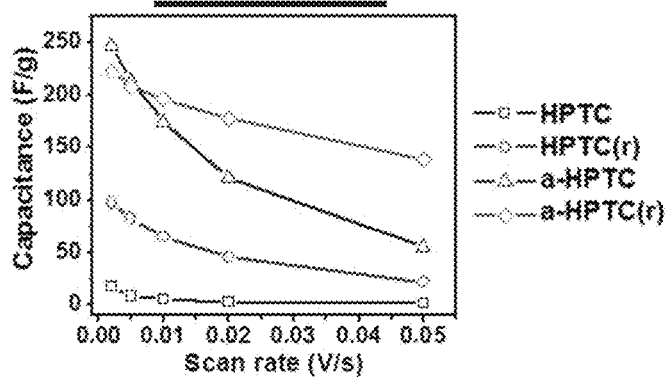

The electrochemical property of r-MCHT was tested with a three-electrode configuration on a VersaSTAT 4 electrochemical workstation (Princeton Applied Research). The working electrode was prepared by mixing 85 wt % r-MCHT and 15 wt % PVDF. A drop of DMF was added into the mixture and grinded into paste. The paste was dropped onto pre-cleaned Ni foam and then dried at 100° C. for 12 hours in a vacuum oven to ensure the binding between active material and Ni foam. In the electrochemical test, Pt wire was used as counter electrode and saturated calomel electrode was used as reference. The working electrode was soaked in 6.0 M KOH electrolyte overnight before test. The cyclic voltammograms (CV) were recorded at different scanning rates of 2, 5, 10, 20, and 50 mV/s in the potential range of −0.8∼0 V, charge-discharge test was conducted at different current densities of 0.2, 0.5, 1, 2 and 5 A/g. Electrochemical impedance spectroscopy (EIS) tests were performed using a sinusoidal signal with mean voltage of 0 V and amplitude of 10 mV over a frequency range of 1,000,000 to 0.01 Hz. Cycling retention was recorded with cycle number up to 10,000.

r-MCHT (identified as HPTC(r) in FIGS. 14A-D) showed outstanding electrochemical energy storage properties with ∼200 F/g capacitance at a voltage scan rate of 2 mV/s. See. FIG. 14B. The cyclic voltammetry curves at scan rate of 2-50 mV/s and charge-discharge curves at current density of 0.2-5 A/g. are presented in FIG. 14A. Rate performance curve in FIG. 14B reveals a capacitance drop to ∼50 F/g with increasing scan rate to 50 mV/s, which may be attributed to the reduced electrolyte ion accessibility to the active site of

TABLE 3

Regression results from pseudo-second order kinetic model.

| | MB | | | MO | | |
|---|---|---|---|---|---|---|
| Species | $q_e$ (mg g$^{-1}$) | $K_{ad}$ (g mg$^{-1}$ min$^{-1}$) | h (mg g$^{-1}$ min$^{-1}$) | $q_e$ (mg g$^{-1}$) | $K_{ad}$ (g mg$^{-1}$ min$^{-1}$) | H (mg g$^{-1}$ min$^{-1}$) |
| MCHT | 100.0 | 0.896 | 8963.78 | 48.3 | 0.046 | 108.58 |
| a-MCHT | 100.0 | 1.949 | 19493.18 | 100.1 | 0.667 | 6680.03 |

Figure 13:
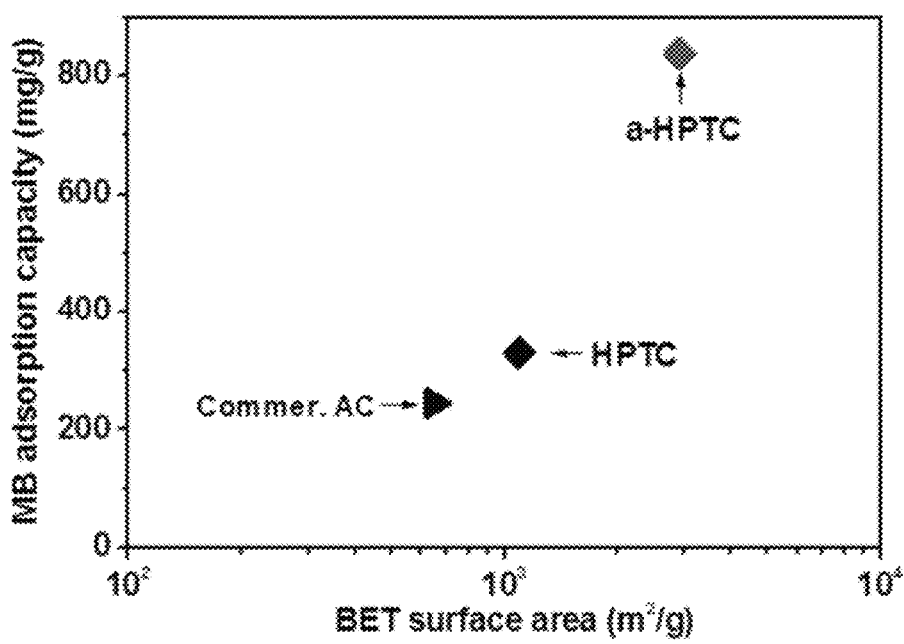
FIG. 13 is a graph plotting MB adsorption capacity against Brunauer-Emmett-Teller (BET) surface area of MCHT, a-MCHT, and a commercially available activated carbon.
Figure 14C:
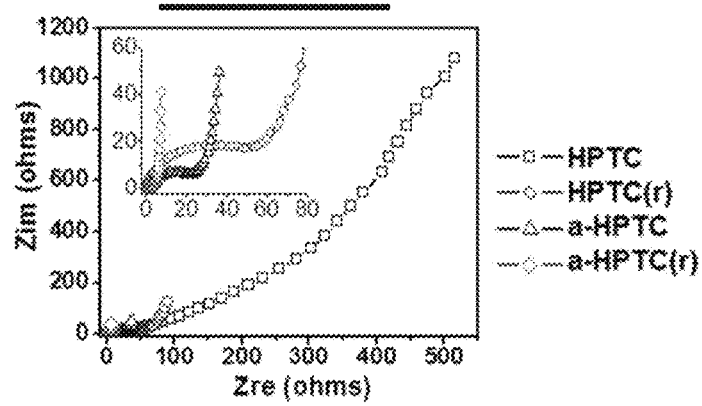
Figure 14D:
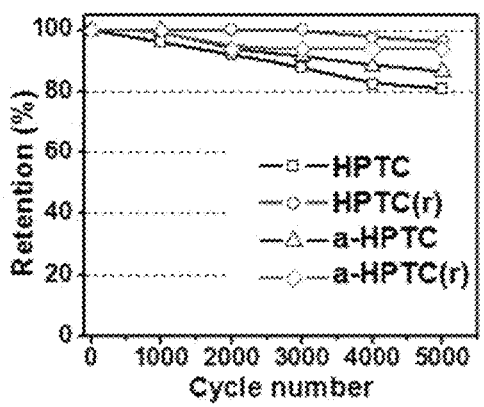

The MB adsorption capacity against BET surface area has been plotted in FIG. 13, where summarizes the MB adsorption capacity by using commercially available activated carbon, MCHT, and a-MCHT. Using commercial activated carbon (HDB M-1951, Cabot Corporation) as a reference, MCHT shows 29.7% enhancement in MB adsorption capacity. After activation, a-MCHT exhibits the highest surface area and largest MB adsorption capacity among all the r-MCHT. The impedance spectrum in FIG. 14C is composed of one semicircle at high frequency and followed by a linear part at low frequency, signifying a typical capacitive behavior with excellent energy storage property. Cycling test over 10,000 cycles shows a good long term stability as 87.5% of the capacitance is maintained after 10,000 cycles, as shown in FIG. 14D. It is worth mentioning that poor energy storage performance was observed in a-MCHT (a-HPTC) even after reduction in $N_2$ and $H_2$ at 800° C. (a-HPTC(r)), which is probably due to the unrecoverable conductivity loss after KOH activation.

Example 2

Materials Preparation

Wood sample was collected from SPF (spruce-pine-fir) lumber. The composition is examined as 41.5% of cellulose, 24.7% hemicellulose, and 33.8% of lignin. SPF was cut into 3×3×10 mm small pieces and carbonized at 800° C. (heating rate: 5° C. min-1) in nitrogen atmosphere for 2 h, and the product was named C-800. By applying a thermal oxidation process on C-800, carbon materials with different porous structures can be produced. Oxidation temperature and time are the two major factors those affect the final pore structure in oxidized carbon. The oxidation temperature is carefully selected within the range of 270-370° C. because material properties will not experience noticeable change when oxidized below 250° C. and white ashes will be observed due to overheating beyond 370° C. With 5 h thermal heating in air, different porous carbon materials can be produced and named MC-T (T=270, 300, 330, 340, 350, 360, and 370° C.). To study the oxidation time effect, C-800 was heated in air at 350° C. for 1, 3, 5, and 7 h and the products were named MC-1H, MC-3H, MC-5H and MC-7H.

Characterization

Thermal stability of C-800 and its oxidized form MC was studied by thermogravimetric analysis (TGA, TA Instruments Q500) in air atmosphere from 20 to 625° C. with a ramp rate of 5° C. min-1. The morphology at cross section area and surface was characterized by scanning electron microscopy (SEM, JEOL-7401). Transmission electron microscopy (TEM) images of C-800, MC-330, and MC-360 were obtained by a JEOL JEM-1230 microscope operated at 120 kV. Samples for TEM observation were prepared by drying a drop of sample powder ethanol suspension on carbon-coated copper TEM grids. X-ray photoelectron spectroscopy (XPS) was accomplished using a PHI VersaProbe II Scanning XPS Microprobe with Al Kα line excitation source. Brunauer-Emmet-Teller (BET) surface area analysis of samples was performed using a TriStar II 3020 surface analyzer (Micromeritics Instrument Corp., USA) by $N_2$ adsorption-desorption isotherms. The average pore size was calculated by the Barret Joyner and Halenda (BJH) method from adsorption isotherm. Raman spectrum was obtained using a Horiba LabRam HR Micro Raman Spectrometer, equipped with a CCD camera detector within the range of 400-3000 cm-1.

Oxidation Temperature and Time

Wood sample was collected from SPF (spruce-pine-fir) lumber. The composition is examined as 41.5% of cellulose, 24.7% hemicellulose, and 33.8% of lignin following Li's work. SPF was cut into 3×3×10 mm small pieces and carbonized at 800° C. (heating rate: 5° C. min-1) in nitrogen atmosphere for 2 h, and the product was named C-800. By applying a thermal oxidation process on C-800, carbon materials with different porous structures can be produced. Oxidation temperature and time are the two major factors those affect the final pore structure in oxidized carbon. The oxidation temperature is carefully selected within the range of 270-370° C. because material properties will not experience noticeable change when oxidized below 250° C. and white ashes will be observed due to overheating beyond 370° C. With 5 h thermal heating in air, different porous carbon materials can be produced and named MC-T (T=270, 300, 330, 340, 350, 360, and 370° C.). To study the oxidation time effect, C-800 was heated in air at 350° C. for 1, 3, 5, and 7 h and the products were named MC-1H, MC-3H, MC-5H and MC-7H.

XPS Characterization of C-800, MC-330, and MC-360

To better understand the surface property change together with the structural change during the oxidation step, XPS characterization was performed on samples C-800, MC-330, and MC-360. The atomic percentage of O 1s is 6.1% in C-800. After oxidation at 330 and 360° C. for 5 h, the atomic percent of O 1s increased to 13.8% and 16.2%, respectively. To quantify further the specific functional groups on the surface, C1s spectrum was deconvoluted into three major bonding, C—C and C=C, C—O, and O—C=O. The area percentage of the deconvoluted peaks is summarized in Table 4, below. The area percentage of C—C and C=C, C—O, and O—C=O in C-800 was 82.7, 12.0, and 5.3%, respectively. The π-π* satellite peak appeared at 290.5 eV due to extended delocalized electrons in aromatic rings. Also, the broad and asymmetric tail toward higher binding energy indicated a high concentration of C=C bonding in the sample. After oxidized at 330 and 360° C., the area percent of C—C and C=C decreased to 67.5 and 59.0%, respectively. Meanwhile, the area percentage of oxygen-containing groups (C—O and O—C=O) increased significantly, which clearly indicated the severe surface oxygenation at elevated temperatures. The disappearance and appearance of π-π* satellite peaks in MC-330 and MC-360 is probably due to the migration (330° C.) and degradation (360° C.) of carbonized lignin.

TABLE 4

Peak Deconvolution Results of C 1s for C-800, MC-330, and MC-360

| Sample | Percentage of deconvoluted peaks (%) | | |
|---|---|---|---|
| | C=C&C—C | C—O | O—C=O |
| C-800 | 82.69 | 12.03 | 5.28 |
| MC-330 | 67.54 | 24.59 | 7.88 |
| MC-360 | 59.01 | 32.22 | 8.76 |

TGA Analysis of Carbon Samples after Oxidation at Different Temperatures

To understand better the pore structure evolution during thermal oxidation, TGA analysis was performed on the carbon samples after oxidation at different temperatures. On the collected DTG curves, two separated degradation peaks were observed in MC-270, MC-300, MC-330, and MC-340, indicating the multiple components in the samples. These results were consistent with the SEM observation, where nanoparticles are separated from carbon bulk phase to form two different materials. After the complete degradation of nanoparticles at the temperature range of 350-370° C., MC-350, MC-360, and MC-370 show only one broad degradation peak that is attributed to the degradation of the porous carbon frame.

N² Adsorption-Desorption Analysis

To investigate the pore structure evolution during thermal oxidation, N² adsorption-desorption analysis was performed. The C-800 showed typical Type I isotherm with prominent adsorption at low relative pressures and then level off at higher relative pressure. Type I isotherm is usually considered to be indicative of adsorption in micropores (<2.0 nm). Type IV hysteresis loops appeared after oxidation at different temperatures of 300-370° C., signifying the formation of mesopores (2-50 nm). The hysteresis loops of MC-300 and MC-330 show type H4 feature and have been attributed to adsorption-desorption in narrow slit-like pores. MC-340, MC-350, MC-360, and MC-370 exhibit type H3 feature, where the loops do not level off at relative pressure close to saturation pressure. A Type H3 loop was reported for materials comprised of aggregates of plate-like particles forming slit-like pores. Time study shows a similar trend that H4 type loops formed with shorter oxidation time (MC-1H and MC-3H) and H4 to H3 type loop transition occurred with longer oxidation times (MC-5H and MC-7H). Before spherical nanoparticles migrated out of the bulk phase to surface, C-cellulose/C-lignin phase separation occurred first and slit-pores were formed at the boundary area. These results were consistent with SEM observation, where only small amount of nanoparticles appeared on the surface with majority remained in the bulk phase. Once the majority of flow phase migrated out to the surface, more internal spaces were created and subsequent structural change led to the type H4-H3 pore structure transition. The adsorption-desorption curves were almost overlapped for MC-340, MC-350, and MC-360, indicating the similar pore structure in these materials. Together with the SEM results in FIGS. 4C-E, it is highly possible that migration and degradation of flow phase occurred within the temperature range of 340-360° C. Once migration is completed, the internal pore structure is fixed and thus similar adsorption-desorption curves were observed.

The BET surface area, average pore size and pore volume are summarized in Table 5. The total surface area gradually increased from 499 to 805 m2/g with increasing oxidation temperature from 300 to 370° C. Compared to C-800, the oxidation process at different temperatures increased the internal surface area (contributed by micropores) slightly by 4.8-12.6% whereas the external surface area was 1.1-6.7 times larger. A similar phenomenon was observed in samples with different heating times. The average pore size did not follow a linear pattern with oxidation temperature due to the existence of two contrary but simultaneous processes: one is new micropore generation and the other is micropore growth into mesopore (or direct mesopore formation). The first process contributed to decrease the average pore size by generating small size pores while the second process did the opposite. The total pore volume increased monotonically with increasing temperature or heating time, indicating the well remained porous carbon frame without structural collapse.

TABLE 5

Summary of N2 Adsorption-Desorption Results

| Sample | $S_{BET}$ (m²/g) | $S_{BET(internal)}$ (m²/g) | $S_{BET(external)}$ (m²/g) | $D_{Pore}$ (nm) | $V_{Pore}$ (cm³/g) |
|---|---|---|---|---|---|
| C-800 | 421 | 378 | 43 | 3.17 | 0.02 |
| MC-300 | 499 | 409 | 90 | 3.64 | 0.06 |
| MC-330 | 623 | 423 | 180 | 4.54 | 0.16 |
| MC-340 | 686 | 418 | 268 | 4.51 | 0.24 |
| MC-350ᵃ | 694 | 426 | 268 | 4.47 | 0.24 |
| MC-360 | 693 | 396 | 298 | 4.49 | 0.28 |
| MC-370 | 805 | 473 | 332 | 4.53 | 0.31 |
| MC-1H | 557 | 434 | 123 | 4.12 | 0.09 |
| MC-3H | 633 | 427 | 206 | 4.38 | 0.18 |
| MC-5Hᵃ | 694 | 426 | 268 | 4.47 | 0.24 |
| MC-7H | 725 | 414 | 311 | 4.60 | 0.29 |

Ramen Characterization of C-Cellulose and C-Lignin

Figure 16:
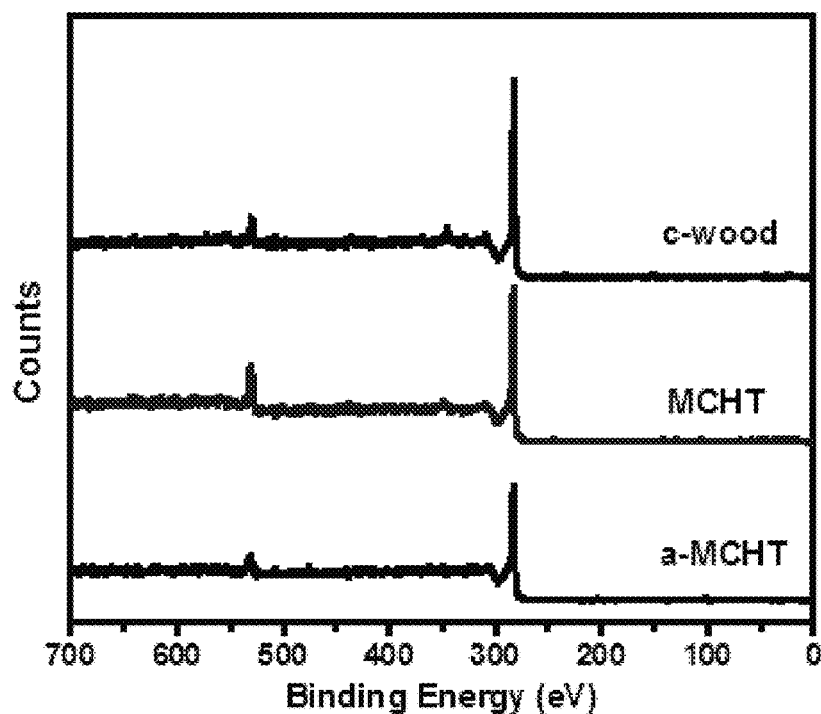
FIG. 16 is a graph showing X-ray photoemission spectroscopy (XPS) profiles of c-wood, MCHT and a-MCHT.

Therefore, Raman technique was used to characterize both C-cellulose and C-lignin. The I(G)/I(D) ratio (G band intensity at 1605 cm-1/D band intensity at 1335 cm-1) is 1.17 and 1.03 (See, FIG. 16) for C-cellulose and C-lignin, respectively, which is consistent with our hypothesis. However, it is worth mentioning that the I(G)/I(D) of C-cellulose might be underestimated since the cellulose molecular weight could be unavoidably decreased during the chemical extraction process. The graphitization degree will be negatively affected by the decreased molecular weight of cellulose. With thermal oxidation at different temperatures, the I(G)/I(D) ratio changes significantly.

Figure 5A:
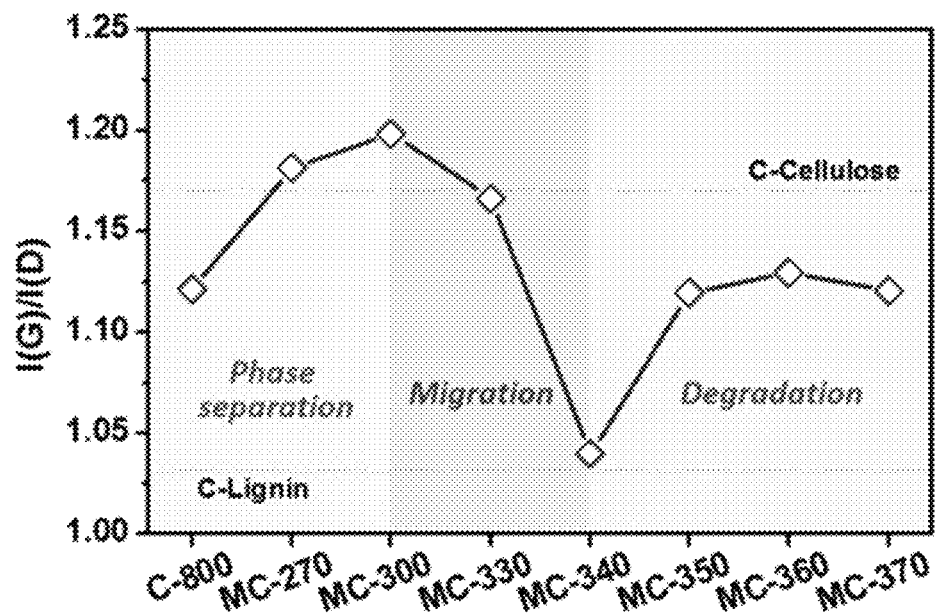
FIGS. 5A-C are graphs showing: I(G)/I(D) ratio of C-800 and MC-T (T=270-370) from Raman spectrum (FIG. 5A); weight loss of C-800 with thermal oxidation at different temperatures (T=330, 340, 350, 360, and 370° C.; heating duration: 5 h) (FIG. 5B); and weight loss of C-800 at different oxidation times (1, 3, 5, and 7 h; T=350° C.) (FIG. 5C).
Figure 5B:
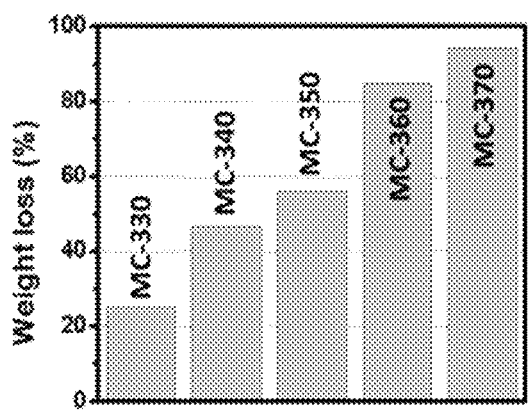
Figure 5C:
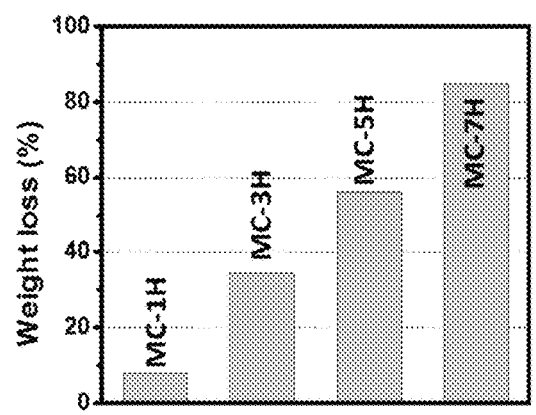

The I(G)/I(D) ratio as a function of oxidation temperature is summarized in FIG. 5A. The change of I(G)/I(D) clearly indicated the surface composition change, which serves as an index to identify the structural evolution. The I(G)/I(D) increased from 1.12 to 1.18 and 1.20 after oxidation at 270 and 300° C. At this stage, phase separation occurred that exposed more C-cellulose component on the surface and leads to higher I(G)/I(D) ratios. The I(G)/I(D) values of MC-270 and MC-300 are larger than that of C-cellulose (1.17), indicating that the C-cellulose component in C-800 acquires a larger graphitization degree than the one carbonized after extraction. By further heating to 340° C., nanoparticle migration became the dominant phenomena at this stage. Accompanied with the migration, I(G)/I(D) dropped down continuously to the lowest value of 1.04 that perfectly matched the 1.03 of C-lignin. Together with the SEM observation of MC-340, the aggregated nanoparticles on the fully covered surface could be identified as C-lignin. With further increasing oxidation temperature to the third stage (350-370° C.), the C-lignin nanoparticles degraded (partial C-cellulose degradation is possible) and I(G)/I(D) went up to 1.12-1.13 in MC-350, MC-360, and MC-370. The relatively lower I(G)/I(D) than that of C-cellulose is attributed to the SP2 to SP3 carbon conversion.

What is claimed is:

1. A method for making a porous carbon material comprising the steps of:
    A. carbonizing a naturally occurring cellulose framework containing lignin to form a carbonized structure containing carbonized cellulose and carbonized lignin, said step of carbonizing including heating the cellulose framework and lignin in the absence of oxygen at a temperature and for a time sufficient to convert said cellulose and at least a portion of said lignin to carbon;
    B. cooling said carbonized structure; and, C. after said step of cooling, oxidizing said carbonized lignin by heating said carbonized structure in the presence of oxygen to a temperature of from about 200° C. to about 500° C. and for a time sufficient to volatilize, and thus remove, at least a portion of said carbonized lignin to provide a porous carbon structure.

2. The method of claim 1 wherein the naturally occurring cellulose framework containing lignin comprises a plant material selected from the group consisting of soft woods, hard woods, switchgrass, cotton, bamboo, walnut shell, peanut shell, rattan, luffa, sugar cane, and combinations thereof.

3. The method of claim 1 wherein said step of carbonizing comprises heating the cellulose framework to a temperature of from about 500° C. to about 1,500° C.

4. The method of claim 1 wherein said step of carbonizing comprises heating said cellulose framework to a temperature of from about 750° C. to about 850° C.

5. The method of claim 1 wherein the step of carbonizing comprises heating said cellulose framework to a temperature of from about 600° C. to about 1500° C. for a period of from about 1 hour to about 6 hours.

6. The method of claim 1 wherein said step of oxidizing includes heating said carbonized structure to an initial temperature of from about 25° C. to about 50° C. and then gradually increasing the temperature to a second temperature from about 200° C. to about 500° C. at a rate of from about 1° C./min to about 20° C./min.

7. The method of claim 1 wherein said step of oxidizing comprises increasing the surface area of the carbonized structure by continuing to heat the cellulose framework after substantially all of said carbonized lignin has been oxidized.

8. The method of claim 1 wherein the porous carbon structure comprises pores having a mean diameter of from 2 nm or more to 30 nm or less.

9. The method of claim 1, wherein, after said step of oxidizing, the method further comprises the step of chemically etching said porous carbon structure thereby increasing its surface area.

10. The method of claim 9 wherein the step of etching comprises contacting said carbonized structure with an oxidizer.

11. The method of claim 9 wherein the step of etching comprises contacting said carbonized structure with potassium hydroxide.

12. The method of claim 1, wherein, after said step of oxidizing, the method further comprises thermally annealing said carbonized structure.

13. The method of claim 12 wherein the step of thermally annealing comprises heating said carbonized structure in an inert atmosphere to a temperature of between 600° C. or more and 1500° C. or less for a period of between 1 hours and 6 hours.

* * * * *